(12) United States Patent
Zhang et al.

(10) Patent No.: US 12,449,968 B2
(45) Date of Patent: Oct. 21, 2025

(54) METHOD AND SYSTEM FOR DISPLAYING VIRTUAL PROP IN REAL ENVIRONMENT IMAGE, AND STORAGE MEDIUM

(71) Applicant: GUANGDONG OPPO MOBILE TELECOMMUNICATIONS CORP., LTD., Guangdong (CN)

(72) Inventors: Xiaoli Zhang, Guangdong (CN); Jie Ji, Guangdong (CN); Xiaoxiao Ma, Guangdong (CN); Chang Min, Guangdong (CN); Jie Zhao, Guangdong (CN); Minghua Zhang, Guangdong (CN); You Li, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 335 days.

(21) Appl. No.: 18/318,575

(22) Filed: May 16, 2023

(65) Prior Publication Data
US 2023/0289049 A1    Sep. 14, 2023

Related U.S. Application Data

(63) Continuation of application No. PCT/CN2021/130445, filed on Nov. 12, 2021.

(30) Foreign Application Priority Data

Nov. 16, 2020 (CN) .......................... 202011282179.6

(51) Int. Cl.
*G06F 3/0486* (2013.01)
*G06F 3/04815* (2022.01)
(Continued)

(52) U.S. Cl.
CPC ........ *G06F 3/0486* (2013.01); *G06F 3/04815* (2013.01); *G06F 3/0482* (2013.01); *G06T 11/00* (2013.01); *G06T 2200/24* (2013.01)

(58) Field of Classification Search
None
See application file for complete search history.

(56) References Cited

U.S. PATENT DOCUMENTS 11,012,390 B1 * 5/2021 Al Majid ................ H04L 51/10
11,521,189 B1 * 12/2022 Gordon ............ G06Q 20/40145
(Continued)

FOREIGN PATENT DOCUMENTS

CN    105912110    8/2016
CN    109634427    4/2019
(Continued)

OTHER PUBLICATIONS

CNIPA, First Office Action for CN Application No. 202011282179.6, Jan. 30, 2022.
(Continued)

*Primary Examiner* — Kyle Zhai
(74) *Attorney, Agent, or Firm* — Hodgson Russ LLP

(57) ABSTRACT

Provided are a method and system for displaying a virtual prop in a real environment image, and a terminal device. The method is implemented by a head-mounted device. In the method, a scene editing interface and a virtual ray on the real environment image are superposed and displayed the scene editing interface contains a prop selection list, and the prop selection list contains a prop selection control corresponding to at least one virtual prop; the virtual ray is moved to intersect with a target prop selection control in the real environment image based on ray adjustment data; and in response to a first control instruction, a target virtual prop (Continued)

corresponding to the target prop selection control is displayed in the real environment image.

20 Claims, 11 Drawing Sheets

(51) Int. Cl.
    *G06F 3/0482*     (2013.01)
    *G06T 11/00*     (2006.01)

(56) References Cited

U.S. PATENT DOCUMENTS

| | | | | |
|---|---|---|---|---|
| 2015/0091943 | A1* | 4/2015 | Lee | G06F 3/012 |
| | | | | 345/633 |
| 2018/0136465 | A1* | 5/2018 | Chi | G06F 3/0416 |
| 2019/0004604 | A1* | 1/2019 | Wang | G06F 3/04886 |
| 2019/0354761 | A1 | 11/2019 | Arshad et al. | |
| 2020/0118310 | A1* | 4/2020 | Matsumoto | G06V 20/586 |
| 2020/0193938 | A1 | 6/2020 | Estruch Tena et al. | |
| 2020/0410763 | A1* | 12/2020 | Hare | G06T 19/20 |

FOREIGN PATENT DOCUMENTS

| | | |
|---|---|---|
| CN | 110115838 | 8/2019 |
| CN | 110310224 | 10/2019 |
| CN | 110325953 | 10/2019 |
| CN | 110694273 | 1/2020 |
| CN | 111035924 | 4/2020 |
| CN | 111589132 | 8/2020 |
| CN | 111782053 | 10/2020 |

OTHER PUBLICATIONS

WIPO, International Search Report and Written Opinion for PCT/CN2021/130445, Feb. 10, 2022.
CNIPA, Second Office Action for CN Application No. 202011282179.6, Sep. 5, 2022.
CNIPA, Decision of Rejection for CN Application No. 202011282179.6, Dec. 29, 2022.
CNIPA, Reexamination Decision for CN Application No. 202011282179.6, Mar. 29, 2023.
CNIPA, Office Action issued for CN Application No. 202011282179.6, Mar. 29, 2023.
Brink, "How to Record video in windows Mixed Reality in windows 10," retrieved from the Internet: <https://www.tenforums.com/tutorials/121147-record-video-windows-mixed-reality-windows-10-a.html>, Dec. 2018.
Bostinno, "Wayfair's iPhone & iPad AR App Lets You Preview Furniture in 3D", retrieved from the Internet: <https://www.youtube.com/watch?v=ds-BgfrEVq4>, Sep. 19, 2017.
EPO, Extended European Search Report for EP Application No. 21891232.7, Jun. 20, 2024.
Microsoft Dynamics 365, "How to teleport, select, and place 3D models: Dynamics 365 Layout for MR headsets," retrieved from the Internet: <https://www.youtube.com/watch?v=BoQtuDZTKgY>, Oct. 30, 2019.
Microsoft Dynamics 365, "How to open and use the Layout app: Dynamics 365 Layout for MR headsets," retrieved from the Internet: <https://www.youtube.com/watch?v=J8hHY7IKBV4&list=PLcakwuelHoT_9t0f4jBO9eyAZaAbz31MB&index=3>, Oct. 30, 2019.
EPO, Partial Supplementary European Search Report for EP Application No. 21891232.7, Mar. 1, 2024.

* cited by examiner

METHOD AND SYSTEM FOR DISPLAYING VIRTUAL PROP IN REAL ENVIRONMENT IMAGE, AND STORAGE MEDIUM

CROSS-REFERENCE TO RELATED APPLICATIONS

This application is a continuation of International Application No. PCT/CN2021/130445, filed Nov. 12, 2021, which claims priority to Chinese Patent Application No. CN202011282179.6, filed Nov. 16, 2020, the entire disclosures of which are incorporated herein by reference.

TECHNICAL FIELD

Embodiments of the present disclosure relates to the technical field of human-computer interaction, in particularly, to a method and system for displaying a virtual prop in a real environment image, and a storage medium.

DESCRIPTION OF RELATED ART

Augmented reality (AR) technology is a technology that merges a virtual content with the real world, which simulates a virtual content such as a character, an image, a three-dimensional model, a music, and a video generated by a computer apparatus, and then superimposes and displays the simulated virtual content in a real environment. Virtual reality (VR) technology simulates a virtual environment and a virtual content according to data acquired from the real environment. A user can experience various operations on an AR content or a VR content using a head-mounted device.

In the related art, when the user completes various operations using the head-mounted device, the corresponding operations are triggered by function buttons in the head-mounted device, and when a head-mounted device focuses on a virtual object, it highlights the virtual object, so that the user can make the head-mounted device execute corresponding instructions through preset operations.

SUMMARY

In one aspect, an embodiment of the present disclosure provides a method for displaying a virtual prop in a real environment image, and the method is implemented by a head-mounted device. In the method, a scene editing interface and a virtual ray are superposed and displayed on the real environment image, the scene editing interface containing a prop selection list, and the prop selection list containing a prop selection control corresponding to at least one virtual prop; the virtual ray is moved to intersect with a target prop selection control in the real environment image based on ray adjustment data; and in response to a first control instruction, a target virtual prop corresponding to the target prop selection control is displayed in the real environment image.

In another aspect, an embodiment of the present disclosure provided a terminal device. The terminal device includes one or more processors, and a memory. The memory is configured to store instructions which, when executed by the one or more processors, cause the one or more processors to: superpose and display a scene editing interface and a virtual ray on the real environment image, the scene editing interface containing a prop selection list, and the prop selection list containing a prop selection control corresponding to at least one virtual prop; move the virtual ray to intersect with a target prop selection control in the real environment image based on ray adjustment data; and in response to a first control instruction, display a target virtual prop corresponding to the target prop selection control in the real environment image.

In still another aspect, an embodiment of the present disclosure provides a system for displaying a virtual prop in a real environment image, and the system for displaying the virtual prop in the real environment image includes a head-mounted device and a control device, a data connection being established between the head-mounted device and the control device; the control device is configured to send a control instruction and ray adjustment data to the head-mounted device; the head-mounted device includes a processor and a memory; the memory is stored with at least one instruction, at least one program, a code set, or an instruction set, the at least one instruction, the at least one program, the code set, or the instruction set is loaded and executed by the processor to implement the method for displaying the virtual prop in the real environment image as described in the above one aspect.

Other features and aspects of the disclosed features will become apparent from the following detailed description, taken in conjunction with the accompanying drawings, which illustrate, by way of example, the features in accordance with embodiments of the disclosure. The summary is not intended to limit the scope of any embodiments described herein.

DETAILED DESCRIPTION OF EMBODIMENTS

Figure 1:
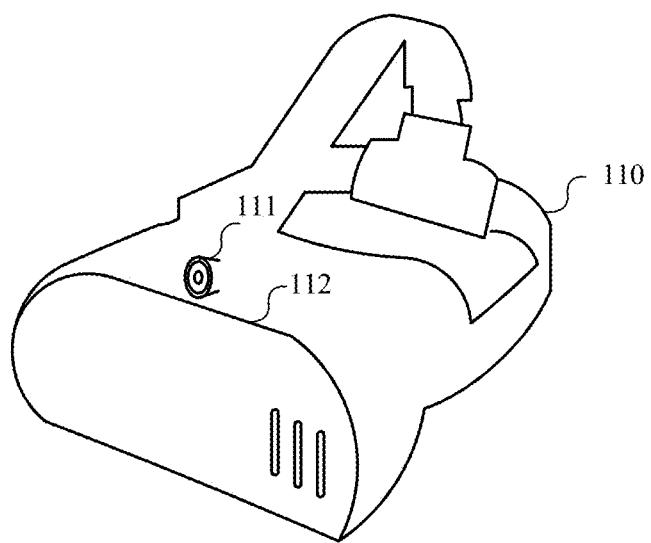
FIG. 1 illustrates a schematic view of a head-mounted device according to an embodiment of the present disclosure.

In order to make objectives, technical solutions, and advantages of the present disclosure more clear, embodiments of the present disclosure will be further described combined with accompanying drawings.

In the present disclosure, the term "multiple" refers to two or more than two. The term "and/or" is used to describe the relationship of related objects, and means that there can be three kinds of relationships, in at least one embodiment, A and/or B may mean three conditions, i.e., A exists alone, A and B exist together, and B exists alone. The character "/" generally indicates that there is an OR relationship between context objects.

In the related art, when a user interacts with a virtual prop through a head-mounted device, by controlling a device posture of the head-mounted device, the user makes a focus position of the head-mounted device be located on a target virtual prop that the user wants to interact with; when the head-mounted device focuses on a virtual prop, the virtual prop will be displayed with a high lighting manner, so that the user can determine whether a current focus position is located on the target virtual prop; then by triggering a corresponding function button, the user makes the head-mounted device execute an instruction to realize the interaction with the target virtual prop.

However, the above-mentioned interactive manner based on the function button is not convenient for the user to complete an operation quickly, and it takes a certain learning cost for the user to find and trigger a correct function button when performing the operation. In addition, for the manner of high lighting displaying the focused object, the user needs to observe a display state of each of virtual objects to determine a current focus position, and the user needs to observe change of the display state of the virtual objects while controlling a posture of the head-mounted device to move a focus position to a target virtual object, and edit the target virtual object, therefore, the learning cost of operation is higher, the steps are complicated and the efficiency is lower.

In a possible embodiment, the head-mounted device may be an augmented reality (AR) device, a virtual reality (VR) device, or an audio-visual device integrating the AR and the VR.

When using the AR technology to display a multimedia content, the head-mounted device can be roughly divided into three types according to display principles.

A first type is a head-mounted device provided with a display screen and a camera, which acquires a surrounding real environment image through the camera, then superimposes virtual information with the real environment image, and displays the superimposed image through the display screen.

A second type is a head-mounted device provided with a projection assembly and a transparent lens, which projects virtual information on the transparent lens through the projection assembly, so that the user can observe a real environment and virtual information through the transparent lens simultaneously, and thus obtain the experience of editing the virtual information in the real environment.

A third type is a head-mounted device provided with a projection assembly and a transparent lens, the projection assembly is arranged inside the head-mounted device, and virtual information may be directly projected to an eyeball of the user through the projection assembly, so that the user can get a user experience of editing the virtual information in a real environment. The virtual information includes a character, a model, a web page, a multimedia content (such as a virtual image, a video, an audio), and the like.

Figure 2:
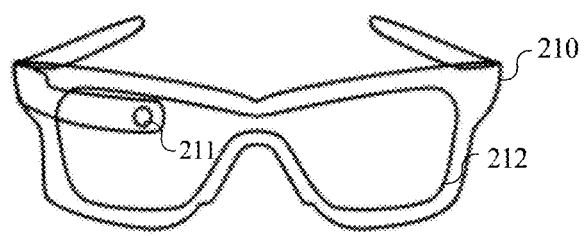
FIG. 2 illustrates a schematic view of a head-mounted device according to another embodiment of the present disclosure.

FIG. 1 illustrates a head-mounted device 110, which may be a head-mounted display (HMD) device. The head-mounted device 110 acquires a real environment image in real time through a camera 111, superimposes virtual information with the real environment image, and displays the superimposed image through a display screen 112. After the user wears the head-mounted device 110 on his head, he can observe a scene where the virtual information is merged with the real environment image through the display screen 112. FIG. 2 illustrates another head-mounted device 210, which is a spectacle device. A projection assembly 211 is arranged outside a lens 212 of the head-mounted device 210, and the head-mounted device 210 projects virtual information to the lens 212 through the projection assembly 211. After the user wears the head-mounted device 210, the user can observe a real environment image and the virtual information simultaneously through the lens 212.

Figure 3:
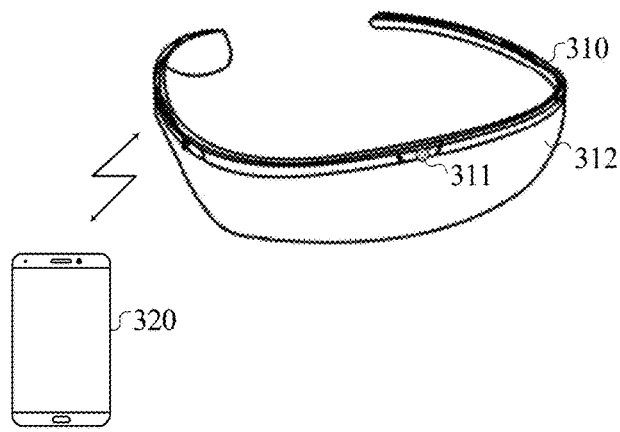
FIG. 3 illustrates a schematic view of a system for displaying a virtual prop in a real environment image according to an embodiment of the present disclosure.

The present disclosure takes the head-mounted device provided with the display screen and the camera as an example. As illustrated in FIG. 3, a head-mounted device 310 is provided with a camera component 311 and a display screen component 312. A surrounding real environment image is photographed in real time by the camera component 311, the real environment image are merged with AR information, the merged real environment image is displayed inside the head-mounted device 310 through the display screen component 312. In a possible embodiment, the head-mounted device 310 has the functions of editing and photographing a virtual scene, and the user can adjust a scene content by changing the device posture of the head-mounted device 310.

In a possible embodiment, the head-mounted device 310 may be configured alone to realize various functions, and may also be used in cooperation with a control device 320. In some embodiments, when the head-mounted device 310 and the control device 320 cooperate to form a system for displaying a virtual prop in a real environment image, a processor of the head-mounted device 310 is responsible for executing most data processing tasks in the embodiments of the present disclosure, and the control device 320 is responsible for sending an instruction and data to the head-mounted device 310 based on a trigger operation of the user; or, a processor of the control device 320 is responsible for executing most data processing tasks in the embodiments of the present disclosure, and the head-mounted device 310 is responsible for rendering an image based on an execution result of the control device 320, which is not limited in the embodiments of the present disclosure.

The control device 320 is connected to the head-mounted device 310, and a device type of the control device 320 includes at least one of a handle, a smart phone and a tablet computer. The control device 320 is provided with at least one of a touch area and a touch button. The head-mounted device 310 indicates a device direction of the control device 320 through a virtual ray in the real environment image, so that the user can in real time grasp the device direction of the control device 320 by observing a position and a direction of the virtual ray, and control the head-mounted device 310 to execute a corresponding instruction based on a touch operation on the control device 320. In a possible embodiment, when the control device 320 is connected to the head-mounted device 310, the head-mounted device 310 synchronously receives a control instruction sent by the control device 320.

In some embodiments, the head-mounted device 310 and the control device 320 are connected through a data line, a wireless fidelity (WiFi) hotspot, or Bluetooth.

A method for displaying a virtual prop in a real environment image according to an embodiment of the present disclosure may include:

superimposing and displaying a scene editing interface and a virtual ray on the real environment image, the scene editing interface containing a prop selection list, the prop selection list containing a prop selection control corresponding to at least one virtual prop;

moving the virtual ray to intersect with a target prop selection control in the real environment image based on ray adjustment data; and in response to a first control instruction, displaying a target virtual prop corresponding to the target prop selection control in the real environment image.

In an illustrated embodiment, the first control instruction includes a prop selection instruction and a prop placement instruction; and in response to the first control instruction, the displaying the target virtual prop corresponding to the target prop selection control in the real environment image includes:

in response to the virtual ray intersecting with the target prop selection control, highlighting the target prop selection control;

in response to the prop selection instruction, displaying the target virtual prop at an intersection of the virtual ray and the real environment image;

moving the virtual ray and the target virtual prop based on the ray adjustment data after the prop selection instruction; and in response to the prop placement instruction, displaying the target virtual prop at a placement position indicated by the prop placement instruction.

In an illustrated embodiment, after in response to the first control instruction, the displaying the target virtual prop corresponding to the target prop selection control in the real environment image, the method further includes:

moving the virtual ray in the real environment image to intersect with an added prop in the real environment image based on the ray adjustment data;

in response to a second control instruction, displaying the added prop at an intersection of the virtual ray and the real environment image; and moving the virtual ray and the added prop based on the ray adjustment data after the second control instruction.

In an illustrated embodiment, after the superimposing and displaying the scene editing interface and the virtual ray on the real environment image, the method further includes:

moving the virtual ray to intersect with the target virtual prop in the real environment image based on the ray adjustment data;

in response to a third control instruction, displaying an editing control corresponding to the target virtual prop;

moving the virtual ray to intersect with a target editing control in the real environment image based on the ray adjustment data; and in response to a fourth control instruction, editing the target virtual prop based on an editing manner corresponding to the target editing control.

In an illustrated embodiment, the editing control includes at least one of a deletion control, an enlargement control and a reduction control; and in response to the fourth control instruction, the editing the target virtual prop based on the editing manner corresponding to the target editing control includes:

in response to the target editing control being the deleting control and receiving the fourth control instruction, deleting the target virtual prop;

in response to the target editing control being the enlargement control and receiving the fourth control instruction, enlarging the target virtual prop by a preset magnification factor; and in response to the target editing control being the reduction control and receiving the fourth control instruction, reducing the target virtual prop by a preset reduction factor.

In an illustrated embodiment, after in response to the first control instruction, displaying the target virtual prop corresponding to the target prop selection control in the real environment image, the method further includes:

based on the ray adjustment data, moving the virtual ray in the real environment image to intersect with a photographing control superimposed and displayed on the real environment image;

and in response to a fifth control instruction, photographing the real environment image and the target virtual prop.

In an illustrated embodiment, in response to the fifth control instruction, the photographing the real environment image and the target virtual prop includes:

in response to the virtual ray intersecting the photographing control and receiving the fifth control instruction, switching the photographing control from a default display state to a photographing display state;

determining a target photographing manner based on an instruction type of the fifth control instruction;

photographing the real environment image and the target virtual prop using the target photographing manner; and superimposing and displaying a photographed preview content on the scene editing interface.

In an illustrated embodiment, the determining the target photographing manner based on the instruction type of the fifth control instruction includes:

in response to the fifth control instruction being a photographing instruction, determining that the photographing manner is image photographing;

in response to the fifth control instruction being a video recording instruction, determining that the photographing manner is video recording, and displaying a recording progress through the photographing control.

In an illustrated embodiment, a data connection is established between a head-mounted device and a control device, the control device is configured to send the ray adjustment data and a control instruction to the head-mounted device, and a ray direction of the virtual ray is a device direction of the control device.

In an illustrated embodiment, before the superimposing and displaying the scene editing interface and the virtual ray on the real environment image, the method further includes:

superimposing and displaying a scene selection interface on the real environment image, where the scene selection interface contains a scene selection control of at least one theme; and the superimposing and displaying the scene editing interface and the virtual ray on the real environment image includes:

based on the ray adjustment data, moving the virtual ray to intersect with a target scene selection control in the real environment image; and in response to a sixth control instruction, superimposing and displaying the virtual ray and the scene editing interface corresponding to the target scene selection control on the real environment image.

In an illustrated embodiment, a scene switching control is displayed in the scene editing interface; and after the superimposing and displaying the scene editing interface and the virtual ray on the real environment image, the method further includes:

based on the ray adjustment data, moving the virtual ray to intersect with the scene switching control in the real environment image;

in response to a seventh control instruction, superimposing and displaying a scene selection list on the real environment image, the scene selection list contains a scene selection control of at least one theme;

based on the ray adjustment data, moving the virtual ray to intersect with a target scene selection control in the real environment image; and in response to an eighth control instruction, superimposing and displaying a target scene editing interface corresponding to the target scene selection control on the real environment image.

Figure 4:
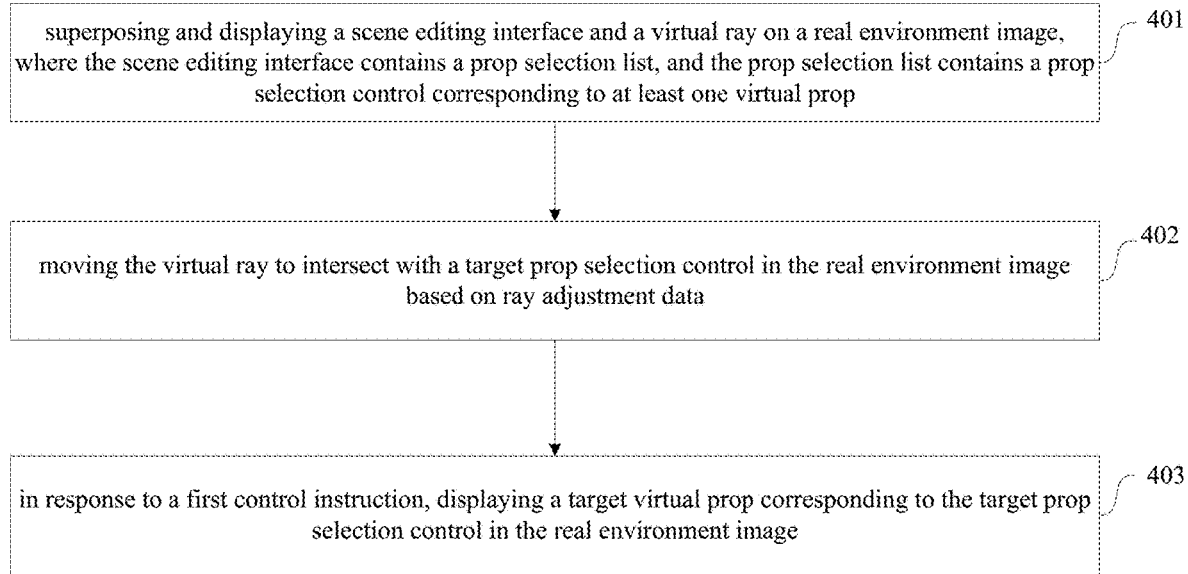
FIG. 4 illustrates a flowchart of a method for displaying a virtual prop in a real environment image according to an embodiment of the present disclosure.

FIG. 4 illustrates a flowchart of a method for displaying a virtual prop in a real environment image according to an embodiment of the present disclosure. This embodiment takes an application of this method to a head-mounted device as an example, and this method may begin from block 401 to block 403.

At block 401, a scene editing interface and a virtual ray are superimposed and displayed on a real environment image, where the scene editing interface contains a prop selection list, the prop selection list contains a prop selection control corresponding to at least one virtual prop.

In some embodiments, the virtual ray is used to indicate a trigger position of a control operation, and the head-mounted device obtains data containing a direction of the virtual ray in real time and displays the virtual ray in the real environment image. In a possible embodiment, a user controls the direction of the virtual ray in a preset manner to make the head-mounted device acquire the data. In some embodiments, the head-mounted device acquires a sight line of the user based on eyeball recognition, and takes a direction of the sight line of the user as the direction of the virtual ray, so that the user can change a position and a direction of the virtual ray only by turning his eyes. In some embodiments, the head-mounted device is provided with a touch area, and the head-mounted device determines the direction of the virtual ray based on a touch operation received from the touch area. In some embodiments, the head-mounted device is provided with a sensor, a device posture of the head-mounted device is obtained through the sensor, and a device direction indicated currently by the device posture is determined as the direction of the virtual ray. When a head of the user is rotated, the scene editing interface is fixed, and the head-mounted device synchronously adjusts the direction of the virtual ray, so as to achieve the effect of controlling the virtual ray by rotating of the head.

After the head-mounted device is turned on, the real environment image is acquired in real time, and virtual information to be displayed is determined according to a user input. In an embodiment of the present disclosure, the head-mounted device runs a camera application, and the virtual information includes a scene editing interface and a virtual ray.

In a possible embodiment, the head-mounted device acquires the real environment image in front of the head-mounted device through a camera component, and displays the real environment image through a display screen component after merging the scene editing interface and the virtual ray into the real environment image, or directly displays the scene editing interface. In some embodiments, the display screen component is located in the front of the head-mounted audio-visual device, so that the user can observe the scene editing interface and the virtual ray by looking straight ahead after wearing the head-mounted device.

The camera application in the embodiment of the present disclosure has a scene editing function, the user uses a virtual prop contained in the prop selection list to form a virtual scene, and the head-mounted device merges and displays the virtual prop and the real environment image. The user can create and edit a virtual scene by using the head-mounted audio-visual device, and photograph the virtual scene and the real environment image, instead of just photographing a preset virtual scene and the real environment image displayed by the head-mounted device.

The head-mounted device displays the scene editing interface at a preset position relative to the real environment image. In at least one embodiment, the head-mounted device displays the scene editing interface in a left area of the display screen component.

Figure 5:
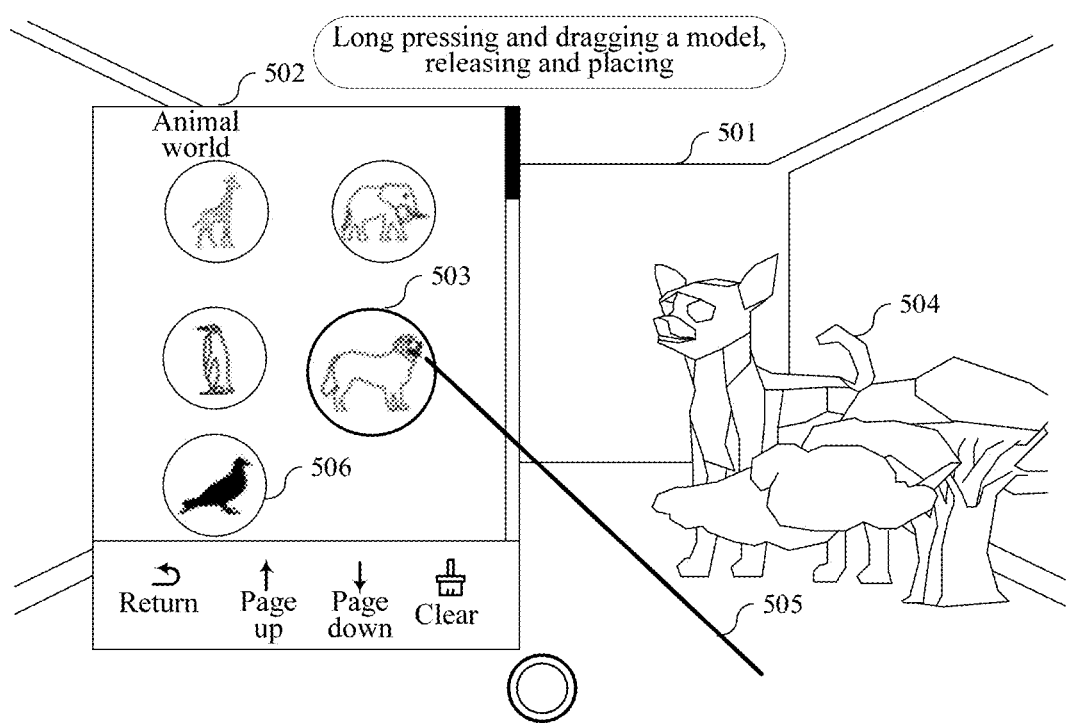
FIG. 5 illustrates a schematic view of a scene editing interface and a virtual prop according to an embodiment of the present disclosure.

FIG. 5 illustrates a display screen of a head-mounted device. The head-mounted device superimposes and displays a scene editing interface 502, a virtual prop 504, and a virtual ray 505 on a real environment image 501, where the scene editing interface 502 includes a prop selection control 503 corresponding to at least one virtual prop. In addition, other functional controls are also displayed in the scene editing interface 502, such as a return control, which is configured to return and display a previous virtual interface; a page-up control and a page-down control, configured to illustrate different props selection controls; a clear control, configured to clear the virtual prop that has been placed in the real environment image with one click.

At block 402, the virtual ray is moved to intersect with a target prop selection control in the real environment image based on ray adjustment data.

The ray adjustment data includes a ray direction of the virtual ray. The head-mounted device obtains the ray adjustment data based on a user operation or information such as user operation sent by other devices, and moves the virtual ray in the real environment image based on the obtained ray adjustment data. In some embodiment, the head-mounted device performs eye recognition in real time, captures a direction of a sight line of the user, and determines the direction of the sight line as the ray direction of the virtual ray. In this case, the ray adjustment data is obtained based on the change of the direction of the sight line of the user, and the user can control the ray direction of the virtual ray in the real environment image by rotating his eyeball.

The head-mounted device takes a intersection of the virtual ray and the target prop selection control as a condition for selecting the target prop selection control, that is to say, when the user adds the target virtual prop in the real environment image, it is necessary to change the ray direction of the virtual ray to make the virtual ray point at the target prop selection control and intersect with the target prop selection control, and then make the head-mounted device display the target virtual prop corresponding to the target prop selection control in the real environment image according to an instruction through a user operation in a preset manner.

At block 403, in response to a first control instruction, a target virtual prop corresponding to the target prop selection control is displayed in the real environment image.

In some embodiments, the head-mounted device is provided with a touch area, and the user can make the head-mounted device receive the first instruction through a touch operation acting on the touch area; or, the user can perform a preset gesture to make the head-mounted device receive the first instruction when the preset gesture is detected. In some embodiments, the first instruction is an instruction for instructing the head-mounted device to perform a user operation, which includes an operation type and operation data that trigger the user operation. The head-mounted device determines an instruction to be executed based on specific information (an operation type and operation data, etc.) contained in the first instruction and a virtual object (a control, a virtual prop, etc.) pointed currently by the virtual ray.

When the virtual ray intersects with the target prop selection control and the first control instruction is received, the head-mounted device adds and displays the target virtual prop corresponding to the target prop selection control in the real environment image. As illustrated in FIG. 5, the virtual ray 505 intersects with the prop selection control 503, when the first control instruction is received by the head-mounted device, and the head-mounted device displays the virtual prop 504 corresponding to the prop selection control 503 in the real environment image 501 according to the first control instruction.

In another possible embodiment, a data connection is established between the head-mounted device and a control device, and the control device is configured to send the ray adjustment data and a control instruction to the head-mounted device, and the ray direction of the virtual ray is a device direction of the control device. In a possible embodiment, the control device sends its own device direction data (such as angles of the control device relative to a x-axis, a y-axis and a z-axis in space, etc.) to the head-mounted device, and the head-mounted device obtains the ray direction of the virtual ray based on the device direction data, thereby to display the virtual ray in the real environment image, so that a user wearing the head-mounted device can grasp the device direction of the control device by observing the virtual ray, and identify a virtual object pointed by the control device.

In summary, in the embodiments of the present disclosure, the virtual prop is provided to the user by displaying the prop selection list, so that the user can select the target virtual prop as required and add the target virtual prop to an appropriate position in the real environment image, and the user can freely create a virtual reality scene; a trigger position of a control operation can be indicated by displaying the virtual ray in real time, and moving and displaying the virtual ray based on the ray adjustment data, so that the user can grasp the trigger position in real time by observing a position and a direction of the virtual ray. The user can quickly control the virtual prop through the head-mounted device only by intersecting the virtual ray with an object to be controlled, such as the virtual prop and a control, thereby improving the control efficiency and operation accuracy of the virtual prop.

Figure 6:
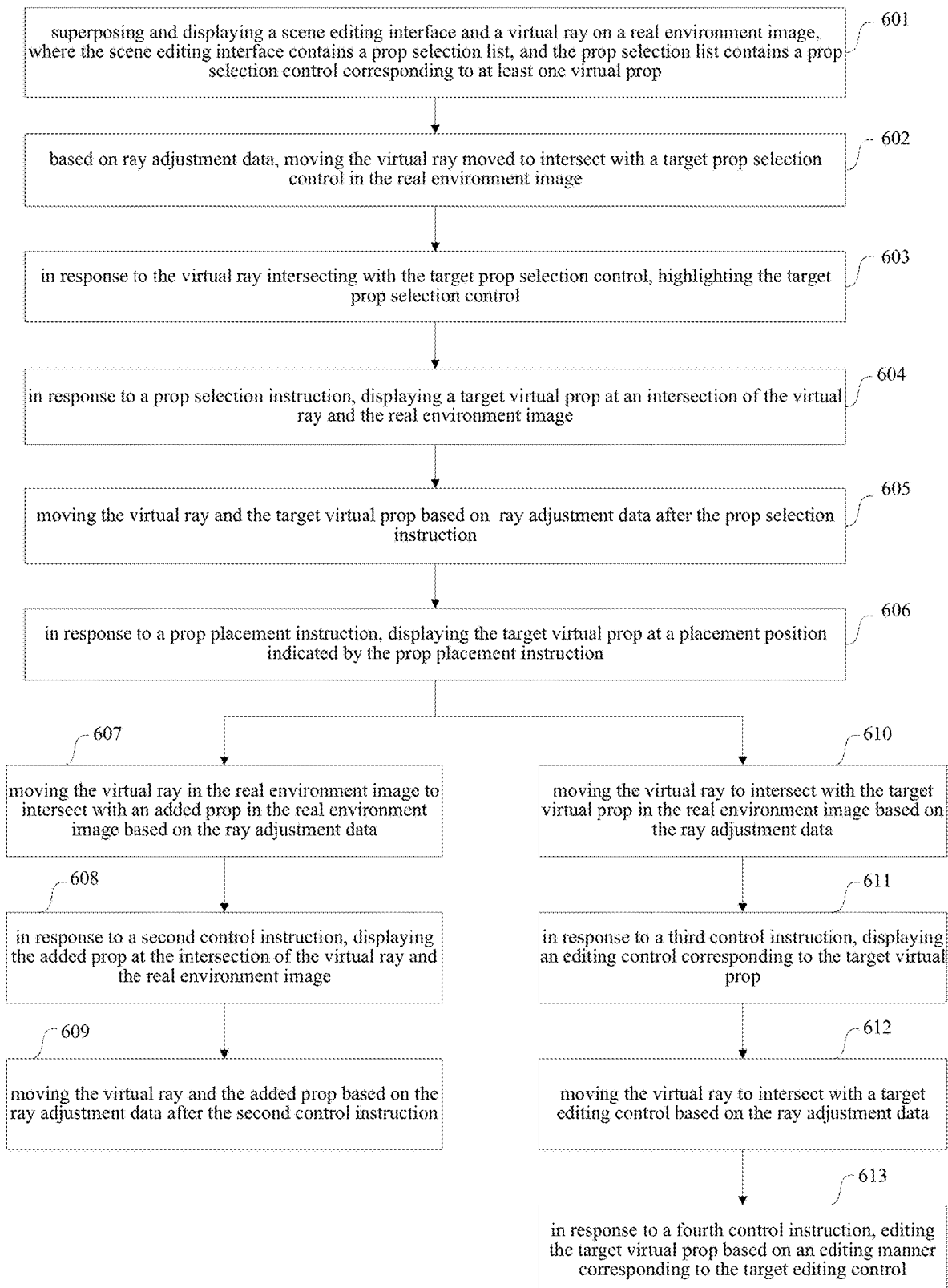
FIG. 6 illustrates a flowchart of a method for displaying a virtual prop in a real environment image according to another embodiment of the present disclosure.

FIG. 6 illustrates a flowchart of a method for displaying a virtual prop in a real environment image according to another embodiment of the present disclosure. This embodiment takes an application of this method to a head-mounted device as an example, and this method may begin from block 601 to block 613.

At block 601, a scene editing interface and a virtual ray are superimposed and displayed on a real environment image, where the scene editing interface contains a prop selection list, and the prop selection list contains a prop selection control corresponding to at least one virtual prop.

At block 602, based on ray adjustment data, the virtual ray is moved to intersect with a target prop selection control in the real environment image.

Specific embodiments of blocks 601 to 602 can be obtained from the detail of the above blocks 401 to 402, which will not be repeated in the embodiments of the present disclosure.

At block 603, in response to the virtual ray intersecting with the target prop selection control, the target prop selection control is highlighted.

The scene editing interface usually contains multiple prop selection controls and other types of controls. In order to further help the user quickly grasp the device direction of the control device, when the virtual ray intersects with the target prop selection control, the head-mounted device highlights the target prop selection control, so that the user can know which prop selection control is selected currently by the virtual ray, so that the user can quickly operate when a virtual prop is required to be added through the prop selection control, or adjust the direction of the virtual ray in time when the user wants to add another prop. In addition, when the virtual ray intersects with the target prop selection control, the target prop selection control is highlighted, so that the user can be immediately prompted that the virtual ray has intersected with the target prop selection control when the virtual ray is in contact with an edge of the target prop selection control, without the need for the user to carefully observe a position of an intersection between the virtual ray and the scene editing interface to confirm whether the virtual ray intersects with the target prop selection control or not, or to continue moving the virtual ray to make the intersection at a center of the prop selection control to ensure the intersection.

In some embodiments, a manner of the highlighting includes at least one of high lighting display, enlarging display, and changing color.

In a possible embodiment, a state of the prop selection control includes a triggerable state, a selected state and a non-triggerable state. When the virtual ray intersects with the target prop selection control (an intersection of the virtual ray and the scene editing interface is located at an edge of the target prop selection control or inside the target prop selection control) and the prop selection control is in the triggerable state, the target prop selection control is highlighted to switch from the triggerable state to the selected state. For a virtual prop that cannot be added, a prop selection control corresponding to this virtual prop is in the non-triggerable state, in some embodiments, a virtual prop cannot be added because an application version is not updated. A display state of the prop selection control in the non-triggerable state is different from that of the prop selection control in the triggerable state, in at least one embodiment, the prop selection control in the triggerable state contains a thumbnail of a corresponding virtual prop, while the prop selection control in the non-triggerable state contains a shadow of a corresponding virtual prop, which is not limited in the embodiments of the present disclosure.

As illustrated in FIG. 5, the virtual ray 505 intersects with the prop selection control 503, the prop selection control 503 is in the selected state, and the head-mounted device enlarges and displays the prop selection control 503 with a high lighting display manner; while the prop selection control 506 is in the non-triggerable state, the head-mounted device only displays a shadow of a corresponding virtual prop in this control, and other prop selection controls are in the triggerable state, in which thumbnails of the corresponding virtual props are displayed.

At block 604, in response to a prop selection instruction, a target virtual prop is displayed at an intersection of the virtual ray and the real environment image.

When the virtual ray intersects with the target prop selection control, and the prop selection instruction is received, the head-mounted device displays a target virtual prop in the real environment image, and displays the target virtual prop at an intersection of the virtual ray and the real environment image, so as to achieve the display effect that the target virtual prop is "adsorbed" on the virtual ray and enable the target virtual prop to move with the virtual ray. When the user changes the ray direction of the virtual ray, the target virtual prop can automatically move with the virtual ray based on the ray adjustment data, so that the user can move the target virtual prop to any position in the real environment image by controlling the virtual ray.

In a possible embodiment, the prop selection instruction is an instruction generated by the control device when the control device receives a prop selection operation. In some embodiments, the prop selection operation is a single-click operation, a double-click operation or a long-press operation, which is not limited in the embodiments of the present disclosure.

In some embodiments, when the head-mounted device receives a control instruction and the ray adjustment data through the control device, the prop selection operation is a long-press operation, then the user can control the virtual ray to intersect with the target prop selection control, and perform the long-press operation in the touch area of the control device, so that the head-mounted device displays the target virtual prop at the intersection of the virtual ray and the real environment image. During this process, when the control device receives the long-press operation, the control device sends an instruction of receiving the long-press operation to the head-mounted device, and the head-mounted device determines that the target virtual prop needs to be displayed at the intersection of the virtual ray and the real environment image according to an operation type indicated by the instruction and an object pointed currently by the virtual ray, and then performs the corresponding displaying.

At block 605, based on ray adjustment data after the prop selection instruction, the virtual ray and the target virtual prop are moved.

When the user wants to move the target virtual prop in the real environment image, the head-mounted device receives ray adjustment data through an operation of the user, and the head-mounted device moves the virtual ray and the target virtual prop based on the ray adjustment data and performs displaying in real time.

In a possible embodiment, when the head-mounted device receives a control instruction and the ray adjustment data through the control device, the user makes the head-mounted device select the target virtual prop through a long-press operation acting on the control device, that is to say, the target virtual prop is displayed at the intersection of the virtual ray and the real environment image, the device posture of the control device is changed, such as through moving or rotating the control device, before the long-press operation is completed, the control device sends the ray adjustment data including a moving direction and a moving distance to the head-mounted device, and the head-mounted device determines a moving direction of the virtual ray and the target virtual prop based on the moving direction of the control device, and determines a moving distance of the target virtual prop based on the moving distance of the control device and a distance mapping relationship, where the distance mapping relationship is a relationship between the moving distance of the control device and a mapping distance of the control device in the real environment image.

In another possible embodiment, the user can add the target virtual prop through the head-mounted device alone, and the head-mounted device obtains a device posture based on its own sensor, and then determines the ray adjustment data when the device posture changes. The head-mounted device is provided with a touch area, and the user can make the target virtual prop "adsorb" at the intersection of the virtual ray and the real environment image through a touch operation (such as a long-press operation) acting on the touch area, and adjust the device posture of the head-mounted device before the touch operation is completed, so that the virtual ray and the target virtual prop can move with a head action of the user.

At block 606, in response to a prop placement instruction, the target virtual prop is displayed at a placement position indicated by the prop placement instruction.

In a possible embodiment, when the head-mounted device receives the prop placement instruction, the target virtual prop is detached from the virtual ray and fixedly placed at a current position. In some embodiments, the prop placement instruction is an instruction generated by the head-mounted device or other devices when receiving a prop placement operation. In some embodiments, the prop placement operation is a single-click operation, a double-click operation, or a long-press operation. In some embodiments, the head-mounted device determines that the prop placement instruction is received at the end of the second control instruction, that is, when the user completes displaying the target virtual prop at the intersection of the virtual ray and the real environment image, the user can place the target virtual prop. The head-mounted device generates the prop placement instruction based on the trigger operation it receives or based on the detected a user gesture, or the head-mounted device receives the prop placement instruction sent by other devices, which is not limited in the embodiments of the present disclosure.

In at least one embodiment, when the head-mounted device receives a control instruction and the ray adjustment data through the control device, if the control device receives a long-press operation, the control device sends the prop selection instruction to the head-mounted device, and when the control device detects that the long-press operation is completed, the control device sends the prop placement instruction to the head-mounted device, that is to say, when the user adds the virtual prop to the real environment image, the user may move the virtual prop by long pressing and moving the control device, and the virtual prop can be displayed fixedly at the current position by releasing a hand of the user, when the virtual prop is moved to a desired position.

Figure 7:
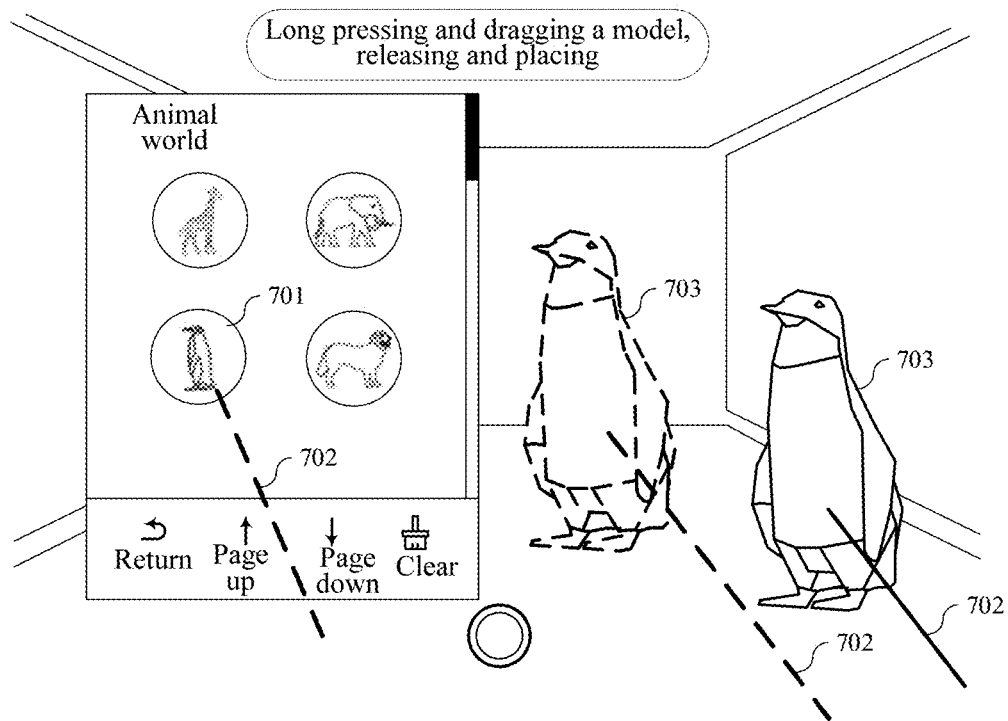
FIG. 7 illustrates a schematic view of moving a virtual prop according to an embodiment of the present disclosure.

FIG. 7 illustrates a schematic view of a process of adding and placing a target virtual object. When a virtual ray 702 intersects with a prop selection control 701, and the head-mounted device receives a prop selection instruction sent by the control device, a virtual prop 703 is displayed at an intersection of the virtual ray 702 and the real environment image, and the virtual prop 703 and the virtual ray 702 are moved based on ray adjustment data sent by the control device. A dotted line in FIG. 7 indicates the virtual prop 703 and the virtual ray 702 in the moving process. When the virtual prop 703 and the virtual ray 702 are moved to a position where a solid line is illustrated in FIG. 7, and the head-mounted device receives a prop placement instruction sent by the control device, the virtual prop 703 is displayed at a display position indicated by the ray adjustment data, the virtual prop 703 is fixedly displayed at the display position, and the virtual prop 703 will not move with the subsequent movement of the virtual ray 702.

In order to facilitate the user to quickly master an interactive manner of adding the virtual prop, the head-mounted device superimposes and displays operation prompt information on the real environment image, as illustrated in FIG. 7, such as "Long pressing and dragging a model, releasing and placing".

At block 607, based on the ray adjustment data, the virtual ray is moved in the real environment image to intersect with an added prop in the real environment image.

At block 608, in response to a second control instruction, the added prop is displayed at the intersection of the virtual ray and the real environment image.

In a possible embodiment, the user can move a virtual prop through the head-mounted device during adding the virtual prop, and can also move a virtual prop that has been placed in the real environment image (that is, the added prop). When the virtual ray intersects with the added prop in the real environment image, and the head-mounted device receives the second control instruction, the added prop are displayed at the intersection of the virtual ray and the real environment image. In some embodiments, the second control instruction is an instruction generated by the head-mounted device or other devices when receiving a prop moving operation. In some embodiments, the prop moving operation is a single-click operation, a double-click operation, a long-press operation, a preset gesture, or the like. The head-mounted device generates the second control instruction based on a trigger operation it receives or a detected user gesture, or the head-mounted device receives the second control instruction sent by other devices, which is not limited in the embodiments of the present disclosure.

At block 609, the virtual ray and the added prop are moved based on the ray adjustment data after the second control instruction.

When the added prop is displayed at the intersection of the virtual ray and the real environment image, the head-mounted device moves and displays the virtual ray and the real environment image based on the received ray adjustment data. In a possible embodiment, the ray adjustment data includes a moving direction and a moving distance.

At block 610, based on the ray adjustment data, the virtual ray is moved to intersect with the target virtual prop in the real environment image.

At block 611, in response to a third control instruction, an editing control corresponding to the target virtual prop is displayed.

The head-mounted device can not only add and move a virtual prop, but also edit the virtual prop, so that a desired display effect can be achieved by editing the virtual prop of the user. In a possible embodiment, when the virtual ray intersects with the target virtual prop and the head-mounted device receives the third control instruction, the editing control corresponding to the target virtual prop is displayed, that is to say, the user can control the virtual ray to intersect with the target virtual prop and perform a prop editing operation, to make the head-mounted device receive the third control instruction, and thus make the virtual prop be in an editing state. In some embodiments, the prop editing operation is a single-click operation, a double-click operation, a long-press operation, or the like, which is not limited in the embodiments of the present disclosure.

Figure 8:
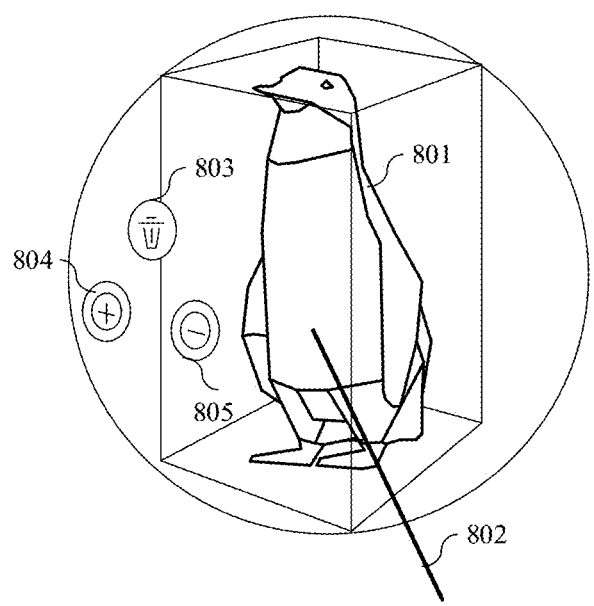
FIG. 8 illustrates a schematic view of editing a virtual prop according to an embodiment of the present disclosure.

As illustrated in FIG. 8, the head-mounted device receives a control instruction and ray adjustment data through the control device, and the virtual ray 802 intersects with the virtual prop 801. When the head-mounted device receives the third control instruction sent by the control device, an editing control corresponding to the virtual prop 801 is displayed.

In some embodiments, multiple virtual props in the real environment image can be in an editing state at the same time, and each of the multiple virtual prop has a corresponding editing control. In some embodiments, a relative position of the editing control corresponding to the target virtual prop and the target virtual prop is fixed (in at least one embodiment, the editing control is displayed on the front of the target virtual prop) and the editing control corresponding to the target virtual prop moves with the movement of the target virtual prop, which is convenient for the user to edit the multiple virtual props flexibly and simplifies user operation. When the virtual ray intersects with the target virtual prop and the target virtual prop is in the editing state, if the third control instruction is received, the editing state of the target virtual prop is cancelled, that is, the editing control corresponding to the target virtual prop is cancelled.

At block 612, based on the ray adjustment data, the virtual ray is moved to intersect with a target editing control.

At block 613, in response to a fourth control instruction, the target virtual prop is edited based on an editing manner corresponding to the target editing control.

In a possible embodiment, the target virtual prop corresponds to editing controls with different functions, and the user controls the virtual ray to intersect with a target editing control, and triggers an operation to make the head-mounted device receive the fourth control instruction, so that the head-mounted device can edit the target virtual prop according to the editing manner corresponding to the target editing control. In at least one embodiment, the editing control includes at least one of a deleting control, an enlargement control and a reduction control, and block 613 may begin from block 613*a* to block 613*c*.

At block 613*a*, in response to the target edit control being the deleting control and receiving the fourth control instruction, the target virtual prop is deleted.

As illustrated in FIG. 8, when the virtual ray 802 intersects with the deleting control 803 and the head-mounted device receives the fourth control instruction, the target virtual prop is deleted from the real environment image. When the head-mounted device receives a control instruction and ray adjustment data through the control device, the fourth control instruction is an instruction generated by the control device when it receives an editing control trigger operation. The editing control trigger operation may be a single-click operation, a double-click operation, a long-press operation, or the like, which is not limited in the embodiments of the present disclosure.

At block 613b, in response to the target editing control being the enlargement control and receiving the fourth control instruction, the target virtual prop is enlarged by a preset magnification factor.

As illustrated in FIG. 8, when the virtual ray 802 intersects with the enlargement control 804 and the head-mounted device receives the fourth control instruction, the target virtual object is enlarged by a preset magnification factor. When the head-mounted device receives a control instruction and ray adjustment data through the control device, the fourth control instruction is an instruction generated when the control device receives an editing control trigger operation, where the editing control trigger operation may include different operation types. In at least one embodiment, when the editing control trigger operation is a single-click operation, the head-mounted device triggers the enlargement control 804 once based on the fourth control instruction, that is to say, an enlargement operation is performed on the target virtual prop 801; when the editing control trigger operation is a long-press operation, the head-mounted device continuously triggers the enlargement control 804 based on the fourth control instruction, that is to say, the target virtual prop 801 are continuously enlarged, when the long-press operation stops, the control device sends an editing end instruction to the head-mounted device, so that the head-mounted device stops enlarging the target virtual prop. The embodiments of the present disclosure are not limited thereto.

At block 613c, in response to the target editing control being the reduction control and receiving the fourth control instruction, the target virtual prop is reduced by a preset reduction factor.

Accordingly, as illustrated in FIG. 8, when the virtual ray 802 intersects with a reduction control 805 and the head-mounted device receives the fourth control instruction, the target virtual object is reduced by a preset reduction factor.

In the embodiments of the present disclosure, when the virtual ray intersects with the target prop selection control, the user can know the prop selection control selected currently by the virtual ray by highlighting the target prop selection control, and it is not necessary to carefully observe positions of the virtual ray and the target prop selection control to ensure the intersection, which is convenient for the user to operate; when the virtual ray intersects with the target prop selection control and the head-mounted device receives the prop selection instruction, the head-mounted device displays the target virtual prop at the intersection of the virtual ray and the real environment image, and the user can move the target virtual prop only by changing the ray direction of the virtual ray, thus improving the control efficiency and operation accuracy of the virtual prop.

Figure 9:
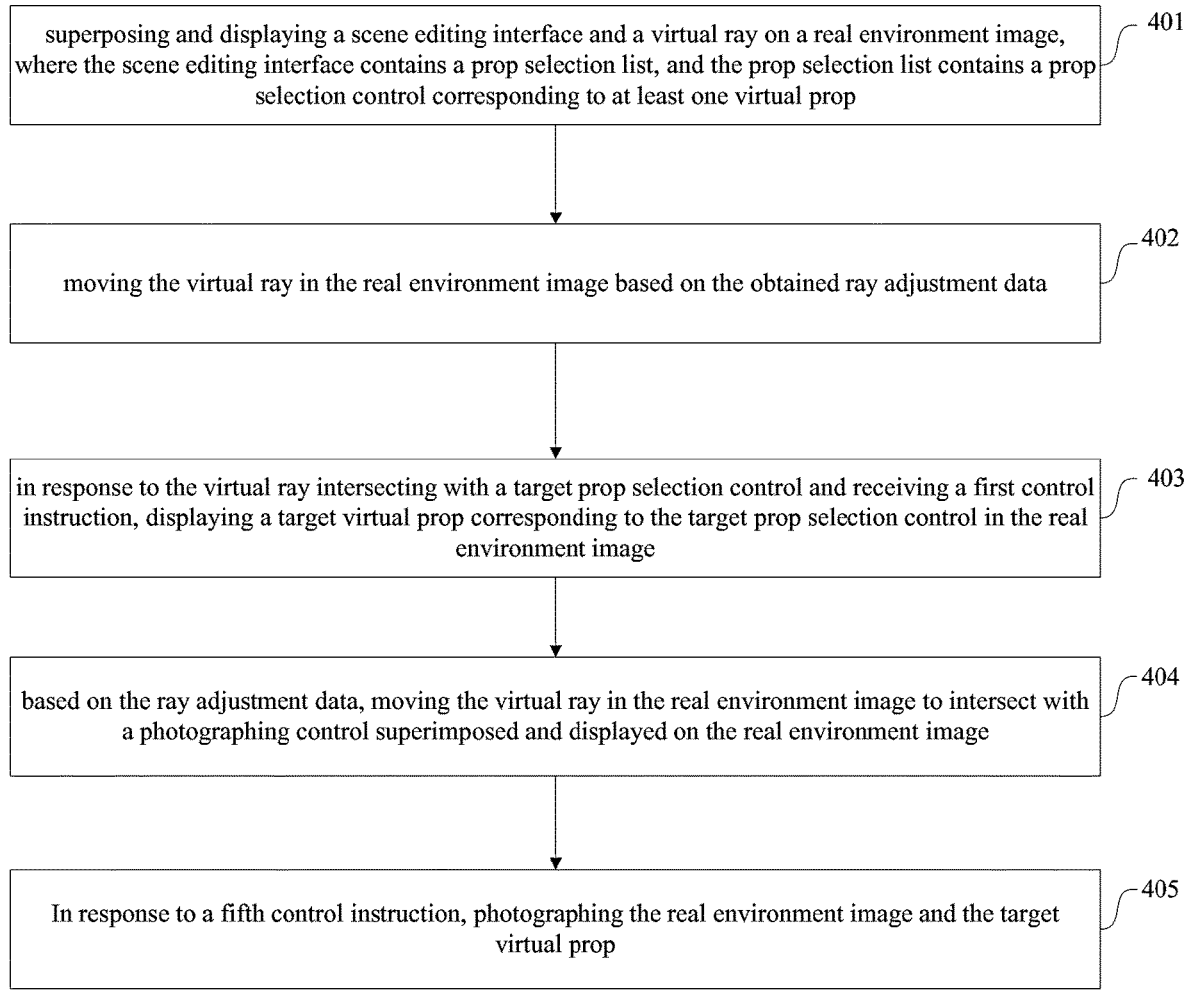
FIG. 9 illustrates a flowchart of a method for displaying a virtual prop in a real environment image according to still another embodiment of the present disclosure.

The above embodiments illustrate the process of adding and editing the virtual prop by the user through the control device and the head-mounted device. In a possible embodiment, the head-mounted device can also complete a photographing function based on virtual ray interaction and other control instructions. On the basis of FIG. 4, FIG. 9 illustrates a flowchart of a method for displaying a virtual prop in a real environment image according to still another embodiment of the present disclosure. This embodiment takes an application of this method to head-mounted device as an example, and after block 403, the method further includes the following blocks 404 and 405.

At block 404, based on the ray adjustment data, the virtual ray is moved in the real environment image to intersect with a photographing control superimposed and displayed on the real environment image.

At block 405, in response to a fifth control instruction, the real environment image and the target virtual prop are photographed.

The head-mounted device takes the intersection of the virtual ray and the photographing control as a condition for selecting the photographing control, that is to say, when photographing needs to be performed, the user makes the virtual ray point to the photographing control and intersects with the photographing control by changing the ray direction of the virtual ray, and makes the head-mounted device receive the fifth control instruction through an operation of the user, so that the head-mounted device can photograph the real environment image and the target virtual prop.

In a possible embodiment, after the head-mounted device completes photographing, a content such as the photographed image or video is automatically stored in a preset storage location, which is convenient for the user to transmit the photographed content to other devices.

In at least one embodiment, after the photographing is completed by the head-mounted device, the content obtained by photographing is displayed; or, after the photographing is completed by the head-mounted device, the scene editing interface and the virtual ray of the virtual prop before the fifth control instruction is received are displayed in the real environment image. The embodiments of the present disclosure are not limited thereto.

In a possible embodiment, block 405 may begin from block 405a to block 405d.

At block 405a, in response to the fifth control instruction, the photographing control is switched from a default display state to a photographing display state.

In order to facilitate the user to confirm whether the head-mounted device is currently performing photographing, when the virtual ray intersects with the photographing control (an intersection of the virtual ray and the scene editing interface is located at an edge of the photographing control or located inside the photographing control) and the fifth control instruction is received, the head-mounted device switches the photographing control from the default display state to the photographing display state. In at least one embodiment, the photographing control in the photographing display state is different from the photographing control in the default display state in at least one element, such as a graphic, a size, a display color and a display effect of the photographing control. During photographing, the photographing control remains in the photographing display state until the photographing is completed.

At block 405b, a target photographing manner is determined based on an instruction type of the fifth control instruction.

In one possible embodiment, the photographing manner in the head-mounted device includes image photographing images and video recording. In order to distinguish interactive manners of the two photographing manners and facilitate the user to quickly select the target photographing manner according to their needs, the trigger operations corresponding to the two photographing manners are different, and instruction types of the corresponding fifth control instruction are also different. The head-mounted device or the control device generates a corresponding fifth control instruction based on the received operation type that triggers the operation, and the head-mounted device determines the target photographing manner based on the instruction type of the fifth control instruction, in at least one embodiment, a user performs a single-click operation on the photographing control to trigger image photographing, and performs a long-press operation on the photographing control to trigger video recording. Block 405*b* includes the following blocks 1 and 2.

At block 1, in response to the fifth control instruction being a photographing instruction, it is determined that the photographing manner is image photographing.

The photographing instruction is an instruction generated when the control device receives a photographing operation. When the head-mounted device determines that the virtual ray intersects with the photographing control, and determines that the photographing operation is received based on the fifth control instruction, it is determined that the photographing manner is image photographing. In at least one embodiment, the photographing operation includes a single-click operation, a double-click operation, a long-press operation, or a preset gesture.

At block 2, in response to the fifth control instruction being a video recording instruction, it is determined that the photographing manner is video recording, and a recording progress is displayed through the photographing control.

The video recording instruction is an instruction generated when the control device receives a video recording operation. When the head-mounted device determines that the virtual ray intersects with the photographing control, and determines that the control device receives the video recording operation based on the fifth control instruction, it is determined that the photographing manner is video recording. In at least one embodiment, the video recording operation includes a single-click operation, a double-click operation, a long-press operation, or a preset gesture.

Operation types of the photographing operation and the video recording operation are different, in at least one embodiment, the photographing operation is a single-click operation, the video recording operation is a long-press operation, and a video recording duration is equal to a press duration of the long-press operation.

Figure 10:
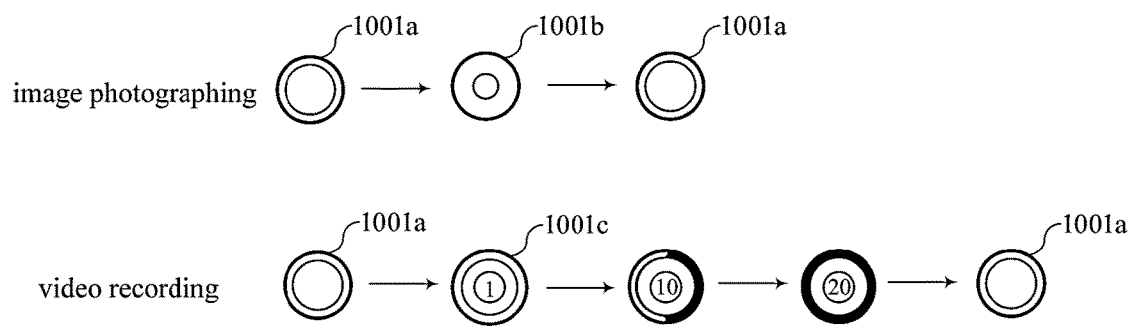
FIG. 10 illustrates a schematic view of photographing controls in different display states according to an embodiment of the present disclosure.

As illustrated in FIG. 10, photographing display states of the photographing control are different under different photographing manners. When the photographing manner is image photographing, the head-mounted device switches a photographing control 1001*a* in a default display state to a photographing control 1001*b* in a photographing display state at a photographing moment, and restores the photographing control 1001*b* in the photographing display state to the photographing control 1001*a* in the default display state at a moment when photographing is completed; when the photographing manner is video recording, the head-mounted device switches the photographing control 1001*a* in the default display state to the photographing control 1001*c* in the photographing display state at a moment of photographing, a recording progress bar is displayed in the photographing control during the video recording, and a recording duration is displayed in the photographing control.

At block 405*c*, the real environment image and the target virtual prop are photographed by the target photographing manner.

In a possible embodiment, the head-mounted device uses the target photographing manner to photograph the real environment image and the target virtual prop, that is, the photographed image or video includes both the real environment image and the virtual prop, but does not include the virtual ray, the scene editing interface, other controls, a virtual content, and the like.

At block 405*d*, a photographed preview content is superimposed and displayed on the scene editing interface.

In order to facilitate the user to check the photographing effect in time, the head-mounted device superimposes and displays the photographed preview content on the scene editing interface after the photographing is completed, in at least one embodiment, a preview image is superimposed displayed on the scene editing interface. In a possible embodiment, the head-mounted device displays the photographed preview content within a preset duration, and automatically cancels the displaying of the photographed preview content after a display duration of the photographed preview content reaches the preset duration, and returns to the scene editing interface, so that the user does not need to manually close the preview content, thus simplifying the user's operation.

Figure 11:
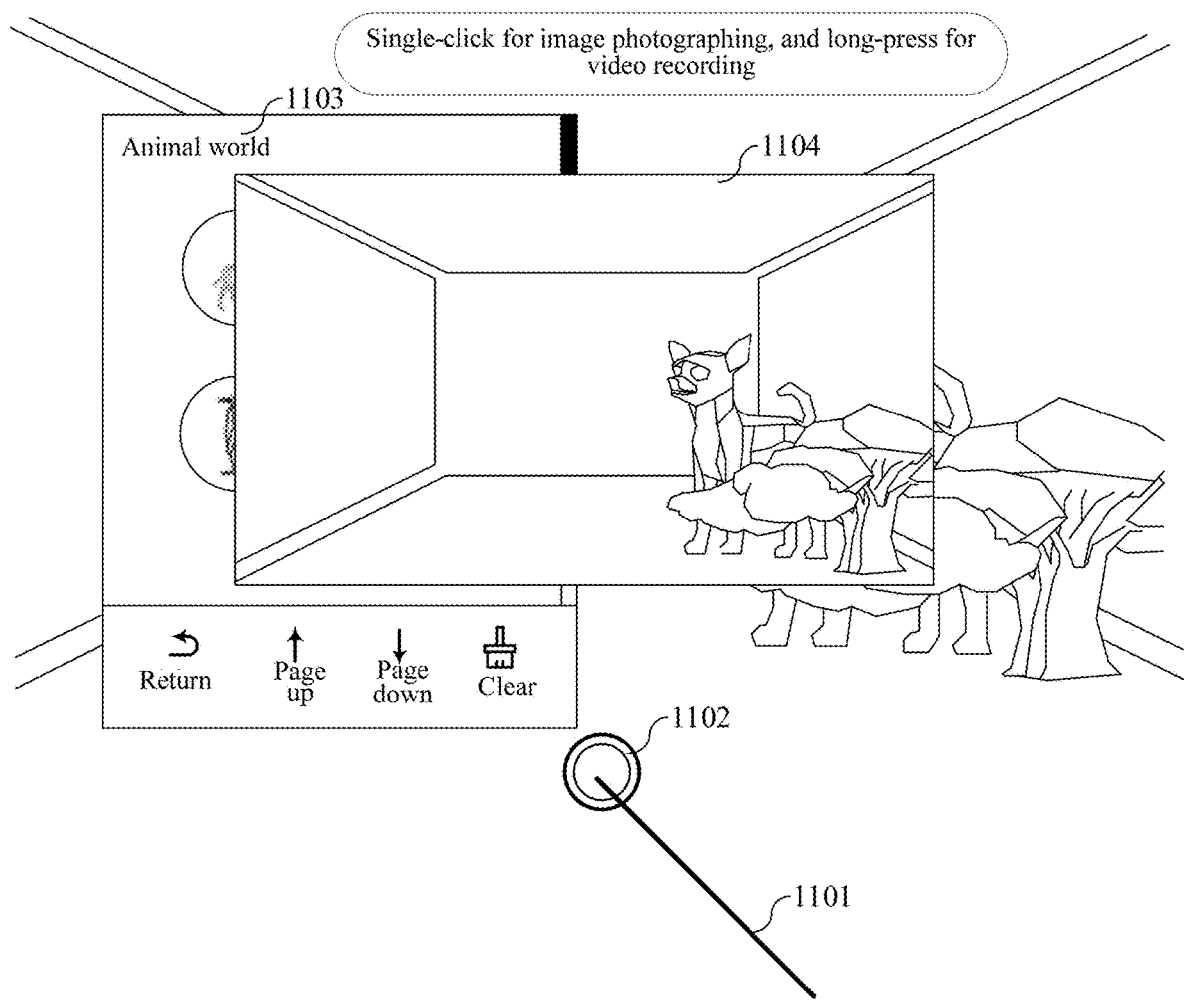
FIG. 11 illustrates a schematic view of photographing a preview content according to an embodiment of the present disclosure.

As illustrated in FIG. 11, when a virtual ray 1101 intersects with a photographing control 1102, and the photographing instruction is received, the head-mounted device photographs the real environment image and the virtual prop to obtain a corresponding image, and displays a photographed preview content 1104 on the scene editing interface 1103.

In the embodiments of the present disclosure, when the virtual ray intersects with the photographing control and the fifth control instruction is received, the head-mounted device switches the photographing control from the default display state to the photographing display state, thereby facilitating the user to confirm whether the head-mounted device is currently photographing; the interaction manners corresponding to different photographing manners are different, which is convenient for the user to quickly select the target photographing manner as required; moreover, after the photographing is completed, the photographed preview content is displayed on the scene editing interface, which is convenient for the user to check the photographing effect in time.

Figure 12:
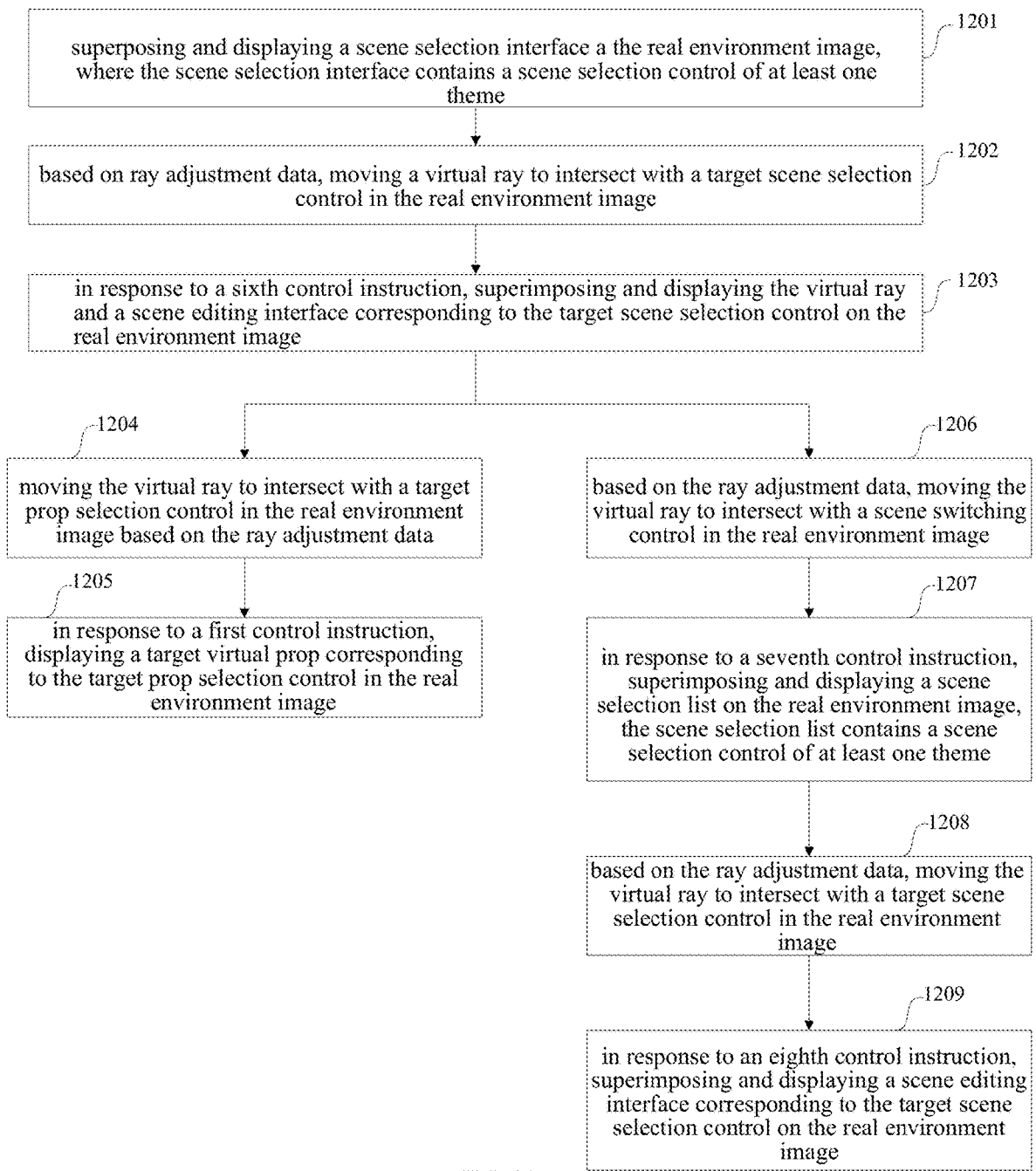
FIG. 12 illustrates a flowchart of a method for displaying a virtual prop in a real environment image according to yet still another embodiment of the present disclosure.

The above embodiments explain the interactive operations of adding, editing and photographing processes of a virtual prop in the same scene. In a possible embodiment, a camera application provided by the embodiments of the present disclosure contains virtual scenes corresponding to different themes, and the user can choose corresponding scenes to experience according to his preferences. FIG. 12 illustrates a flowchart of a method for displaying a virtual prop in a real environment image according to yet still another embodiment of the present disclosure. This embodiment takes an application of this method to a head-mounted device as an example, and the method may begin from block 1201 to block 1209.

At block 1201, a scene selection interface is displayed on a real environment image, the scene selection interface contains a scene selection control of at least one theme.

In a possible embodiment, after the head-mounted device starts a camera application, a scene selection interface is displayed on a real environment image, the scene selection interface contains a scene selection control of at least one theme, and the user is prompted to select one theme to perform scene setting and photographing experience. Virtual props contained in scenes with different themes are different.

At block 1202, based on ray adjustment data, the virtual ray is moved to intersect with a target scene selection control in the real environment image.

At block 1203, in response to a sixth control instruction, the virtual ray and a scene editing interface corresponding to the target scene selection control are superimposed and displayed on the real environment image.

In a possible embodiment, the sixth control instruction is an instruction generated when the control device or the head-mounted device receives a scene selection operation, and when the head-mounted device determines that the virtual ray intersects with the target scene selection control, and determines that the scene selection operation is received based on the sixth control instruction, the virtual ray and the scene editing interface corresponding to the target scene selection control are superimposed and displayed on the real environment image. In at least one embodiment, the scene selection operation includes a single-click operation, a double-click operation, a long-press operation, or a preset gesture, which is not limited in the embodiments of the present disclosure.

Figure 13:
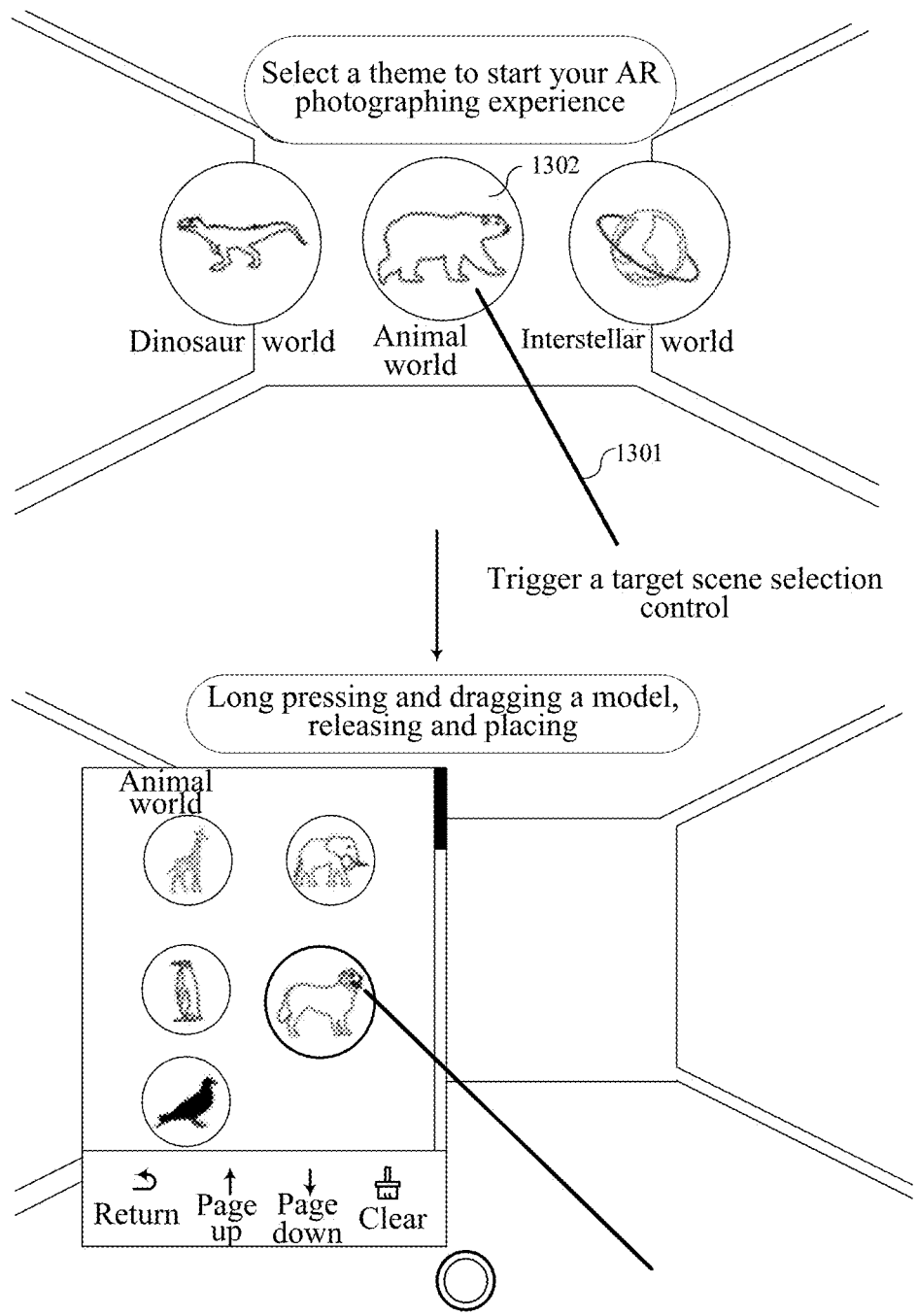
FIG. 13 illustrates a schematic view of opening a scene editing interface using a scene selection control according to an embodiment of the present disclosure.

As illustrated in FIG. 13, scene selection controls corresponding to three different themes are superimposed and displayed on the real environment image. When a virtual ray 1301 intersects with a scene selection control 1302 and the head-mounted device receives the sixth control instruction, the scene selection control 1302 is triggered, and the scene selection interface is switched to the scene editing interface.

At block 1204, based on the ray adjustment data, the virtual ray is moved to intersect with a target prop selection control in the real environment image.

At block 1205, in response to a first control instruction, a target virtual prop corresponding to the target prop selection control is displayed in the real environment image.

Specific embodiments of blocks 1204 to 1205 can be obtained from the detail of the above blocks 402 to 403, which will be not repeated in the embodiments of the present disclosure.

At block 1206, based on the ray adjustment data, the virtual ray is moved to intersect with a scene switching control in the real environment image.

At block 1207, in response to a seventh control instruction, a scene selection list is superimposed and displayed on the real environment image, the scene selection list contains a scene selection control of at least one theme.

In order to facilitate the user to switch to a virtual scene of another theme in a process of experiencing a virtual scene of a certain theme, the scene editing interface displayed by the head-mounted device also includes a scene switching control, so that the user can trigger the scene switching control to make the head-mounted device display the scene selection list and open another scene through the scene selection control in the scene selection list without returning to the scene selection interface to re-select the another scene, which simplifies the user's operation.

Figure 14:
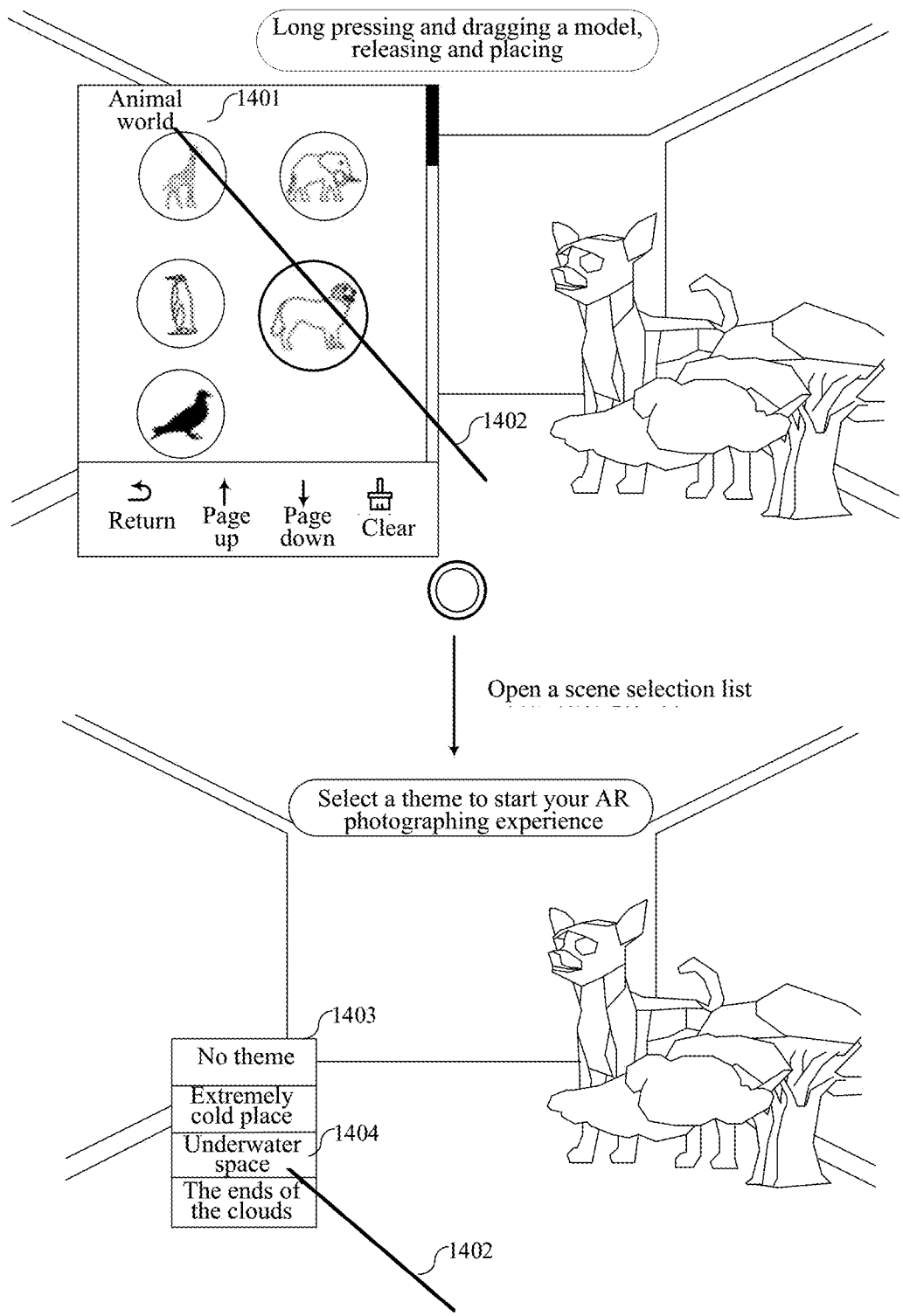
FIG. 14 illustrates a schematic view of opening a scene selection list using a scene switching control according to an embodiment of the present disclosure.

As illustrated in FIG. 14, the head-mounted device receives a control instruction and ray adjustment data through the control device, displays a scene switching control 1401 in a scene editing interface, and a virtual ray 1402 intersects with the scene switching control 1401 and the head-mounted device receives the seventh control instruction sent by the control device, the head-mounted device superimposes and displays a scene selection list 1403 on the real environment image.

At block 1208, based on the ray adjustment data, the virtual ray is moved to intersect with a target scene selection control in the real environment image.

At block 1209, in response to an eighth control instruction, a scene editing interface corresponding to the target scene selection control is superimposed and displayed on the real environment image.

In a possible embodiment, the head-mounted device keeps the virtual prop placed currently in the real environment image after switching the scene editing interface to the scene selection list, so that the user can set up a virtual scene by using virtual props in different theme scenes.

As illustrated in FIG. 14, the head-mounted device receives a control instruction and ray adjustment data through the control device, and when the virtual ray 1402 intersects with a scene selection control 1404 and the eighth control instruction sent by the control device is received, the head-mounted device superimposes and displays a scene editing interface corresponding to a target scene selection control on the real environment image.

The camera application in the embodiments of the present disclosure contains virtual scenes of different themes, and the user can choose a scene with a corresponding theme to experience according to his preferences. The scene editing interface displayed by the head-mounted device also includes the scene switching control, therefore, when the virtual ray intersects with the scene switching control and the seventh control instruction is received, the head-mounted device displays a scene selection list, and the head-mounted device can open other scenes by triggering the scene selection control in the scene selection list, thereby meeting the user's demand of switching to the virtual scenes of other themes in the process of experiencing a virtual scene of a certain theme, without returning to the scene selection interface to re-select the other virtual scenes, which simplifies the user's operation.

Figure 15:
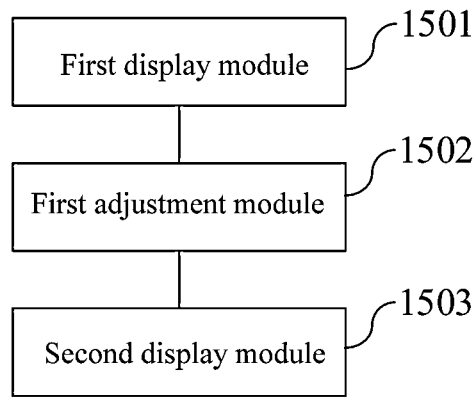
FIG. 15 illustrates a structural block diagram of a device for displaying a virtual prop in a real environment image according to an embodiment of the present disclosure.

FIG. 15 illustrates a structural block diagram of a device for displaying a virtual prop in a real environment image according to an embodiment of the present disclosure. The device may be realized as a whole or a part of a terminal through software, a hardware or a combination thereof. The device may include a first display module 1501, a first adjustment module 1502, and a second display module 1503.

The first display module 1501 is configured to superimpose and display a scene editing interface and a virtual ray on the real environment image, where the scene editing interface contains a prop selection list, the prop selection list contains a prop selection control corresponding to at least one virtual prop.

The first adjustment module 1502 is configured to move the virtual ray to intersect with a target prop selection control in the real environment image based on ray adjustment data.

The second display module 1503 is configured to: in response to a first control instruction, display a target virtual prop corresponding to the target prop selection control in the real environment image.

In an illustrated embodiment, the first control instruction includes a prop selection instruction and a prop placement instruction; and the second display module 1503 includes a first display unit, a second display unit, a moving unit, and a releasing unit.

The first display unit is configured to: in response to the virtual ray intersecting with the target prop selection control, highlight the target prop selection control.

The second display unit is configured to: in response to the prop selection instruction, display the target virtual prop at an intersection of the virtual ray and the real environment image.

The moving unit is configured to move the virtual ray and the target virtual prop based on ray adjustment data after the prop selection instruction.

The releasing unit is configured to: in response to the prop placement instruction, display the target virtual prop at a placement position indicated by the prop placement instruction.

In an illustrated embodiment, the device further includes a second adjustment module, a third display module, and a moving module.

The second adjustment module is configured to: based on the ray adjustment data, move the virtual ray in the real environment image to intersect with an added prop in the real environment image.

The third display module is configured to: in response to a second control instruction, display the added prop at an intersection of the virtual ray and the real environment image.

The moving module is configured to move the virtual ray and the added prop based on ray adjustment data after the second control instruction.

In an illustrated embodiment, the device further includes a third adjustment module, a fourth display module, a fourth adjustment module and an editing module.

The third adjustment module is configured to: based on the ray adjustment data, move the virtual ray to intersect with the target virtual prop in the real environment image.

The fourth display module is configured to: in response to a third control instruction, display an editing control corresponding to the target virtual prop.

The fourth adjustment module is configured to: based on the ray adjustment data, move the virtual ray to intersect with a target editing control in the real environment image.

The editing module is configured to: in response to a fourth control instruction, edit the target virtual prop based on an editing manner corresponding to the target editing control.

In an illustrated embodiment, the editing control includes at least one of a deletion control, an enlargement control and a reduction control; and the editing module includes a first editing unit, a second editing unit, and a third editing unit.

The first editing unit is configured to: in response to the target editing control being the deleting control and receiving the fourth control instruction, delete the target virtual object;

The second editing unit is configured to: in response to the target editing control being the enlargement control and receiving the fourth control instruction, enlarge the target virtual object by a preset magnification factor; and The third editing unit is configured to: in response to the target editing control being the reduction control and receiving the fourth control instruction, reduce the target virtual object by a preset reduction factor.

In an illustrated embodiment, the device further includes a fifth adjustment module and a photographing module.

The fifth adjustment module is configured to: based on the ray adjustment data, move the virtual ray in the real environment image to intersect with a photographing control superimposed and displayed on the real environment image.

The photographing module is configured to: in response to a fifth control instruction, photograph the real environment image and the virtual prop.

In an illustrated embodiment, the photographing module includes a third display unit, a determination unit, a photographing unit, and a third display unit.

The third display unit is configured to: in response to the fifth control instruction, switch the photographing control from a default display state to a photographing display state.

The determination unit is configured to determine a target photographing manner based on an instruction type of the fifth control instruction.

The photographing unit is configured to photograph the real environment image and the virtual prop using the target photographing manner.

The third display unit is configured to superimpose and display a photographed preview content on the scene editing interface.

In an illustrated embodiment, the determination unit is further configured to: in response to the fifth control instruction being a photographing instruction, determine that the photographing manner is image photographing; and in response to the fifth control instruction being a video recording instruction, determine that the photographing manner is video recording, and display a recording progress through the photographing control.

In an illustrated embodiment, a data connection is established between a head-mounted device and a control device, the control device is configured to send ray adjustment data and a control instruction to the head-mounted device, and a ray direction of the virtual ray is a device direction of the control device.

In an illustrated embodiment, the device further includes a fifth display module, configured to display a scene selection interface on the real environment image, where the scene selection interface contains a scene selection control of at least one theme.

The first display module 1501 includes a first adjustment unit and a fifth display unit.

The first adjustment unit is configured to: based on the ray adjustment data, move the virtual ray to intersect with a target scene selection control in the real environment image.

The fifth display unit is configured to: in response to a sixth control instruction, superimpose and display the virtual ray and a scene editing interface corresponding to the target scene selection control on the real environment image.

In an illustrated embodiment, a scene switching control is displayed in the scene editing interface; and the device further includes a sixth adjustment module, a sixth display module, a seventh adjustment module, and a seventh display module.

The sixth adjustment module is configured to: based on the ray adjustment data, move the virtual ray to intersect with the scene switching control in the real environment image.

The sixth display module is configured to: in response to a seventh control instruction, superimpose and display a scene selection list on the real environment image, the scene selection list containing a scene selection control of at least one theme.

The seventh adjustment module is configured to: based on the ray adjustment data, move the virtual ray to intersect with a target scene selection control in the real environment image.

The seventh display module is configured to: in response to an eighth control instruction, superimpose and display the scene editing interface corresponding to the target scene selection control on the real environment image.

In summary, in the embodiment of the present disclosure, a virtual ray is displayed in real time, and the virtual ray is moved and displayed based on ray adjustment data to indicate a trigger position of a control operation, so that the user can grasp the trigger position in real time by observing a position and a direction of the virtual ray, and the user can quickly control a virtual prop through a head-mounted virtual device only by intersecting the virtual ray with an object to be controlled, such as the virtual prop and a control, thereby improving the control efficiency and operation accuracy of the virtual prop.

Figure 16:
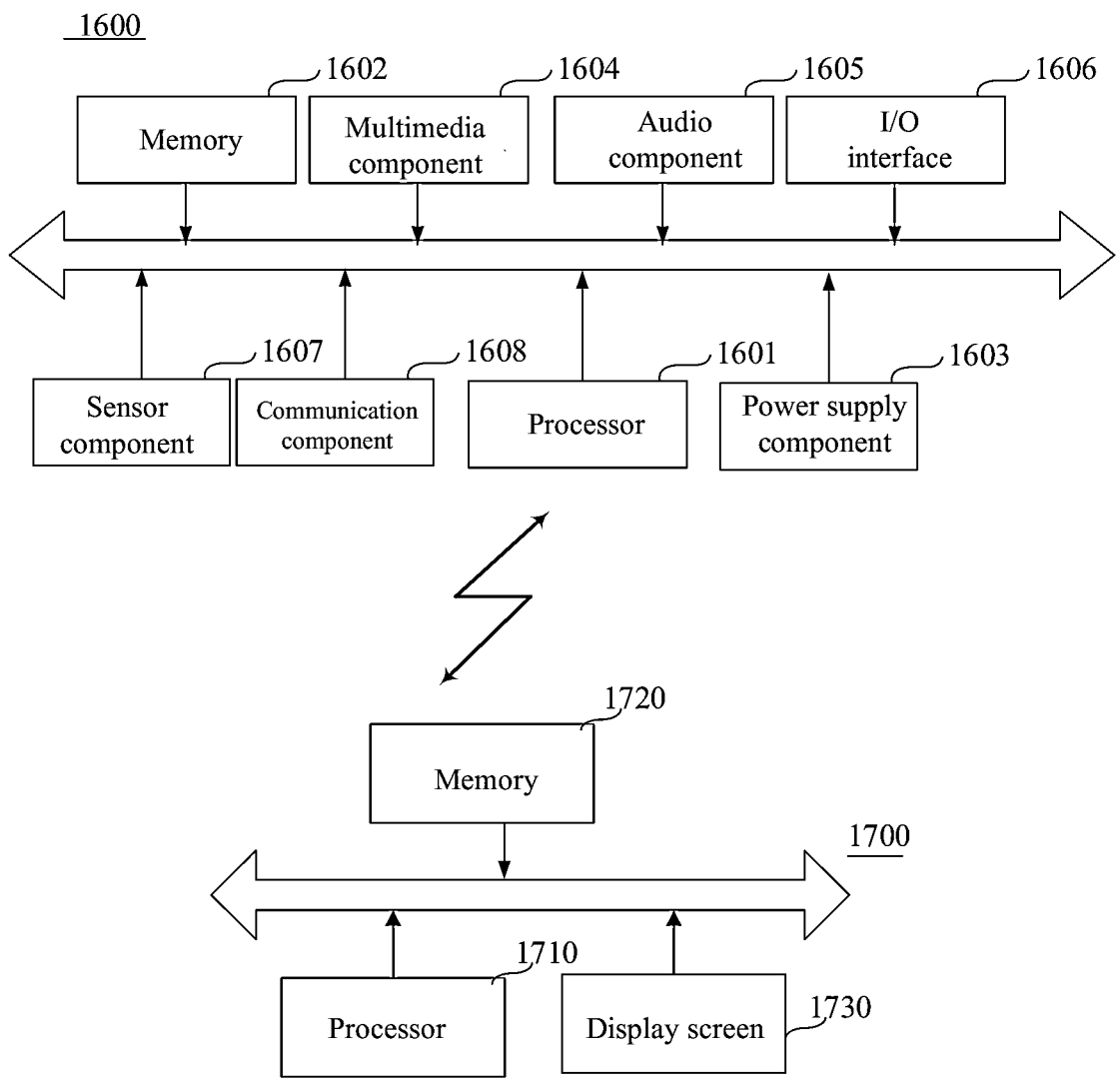
FIG. 16 illustrates a structural block diagram of a system for displaying a virtual prop in a real environment image according to an embodiment of the present disclosure.

As illustrated in FIG. 16, an embodiment of the present disclosure provides a structural block diagram of a system of displaying a virtual prop in a real environment image. The system of displaying the virtual prop in the real environment image includes a head-mounted device 1600 and a control device 1700. The head-mounted device 1600 may include one or more of the following components: a processor 1601, a memory 1602, a power supply component 1603, a multimedia component 1604, an audio component 1605, an input/output (I/O) interface 1606, a sensor component 1607, and a communication component 1608.

The processor 1601 generally controls the overall operations of the head-mounted device, such as operations associated with display, telephone call, data communication, camera operations and recording operations. The processor 1601 may include one or more processing cores. The processor 1601 connects various parts in the whole device 1600 with various interfaces and lines, and performs various functions of the head-mounted device 1600 and processes data by running or executing an instruction, a program, a code set or an instruction set stored in the memory 1602 and calling data stored in the memory 1602. In an illustrated embodiment, the processor 1601 may be implemented in at least one hardware form of Digital Signal Processing (DSP), a Field-Programmable Gate Array (FPGA) and a Programmable Logic Array (PLA). The processor 1601 may be integrated with one or a combination of a Central Processing Unit (CPU), a Graphics Processing Unit (GPU) and a modem. In an illustrated embodiment, the CPU mainly deals with an operating system, a user interface and application programs; the GPU is configured to render and draw contents that need to be displayed on a screen; the modem is configured to deal with wireless communication. It can be understood that the above modem may also be realized by a communication chip without being integrated into the processor 1601.

The memory 1602 is configured to store various types of data to support operations on the head-mounted device. Examples of such data include an instruction, a model, contact data, phone book data, a message, an image, and a video for any application program or method operated on the head-mounted device. The memory 1602 may include a Random Access Memory (RAM) or a Read-Only Memory (ROM). In an illustrated embodiment, the memory 1602 may include a non-transitory computer-readable storage medium. The memory 1602 may be configured to store an instruction, a program, a code, a code set, or an instruction set. The memory 1602 may include a program storage area and a data storage area, where the program storage area may store an instruction for realizing an operating system, an instruction for realizing at least one function (such as a touch function, a sound playing function, an image playing function), an instruction for realizing the above-mentioned various method embodiments. The operating system may be an Android system (including a deep developed system based on the Android system), an IOS system developed by Apple (including a deep developed based on the IOS system), or the like. The data storage area may also store data (such as a phone book, audio and video data, chat record data) created by the head-mounted device 1600 in use.

The power supply component 1603 provides power to various components of the head-mounted device 1600. The power component 1603 may include a power management system, one or more power supplies, and other components associated with generation, management and distribution of power for the head-mounted device 1600.

The multimedia component 1604 may include a screen that provides an output interface between the head-mounted device 1600 and the user. In some embodiments, the screen may include a Liquid Crystal Display (LCD) and a touch panel (TP). If the screen may include the TP, the screen may be implemented as a touch screen to receive an input signal from the user. The TP may include one or more touch sensors to sense touches, swipes and gestures on the TP. The touch sensors may not only sense a boundary of a touch or swipe action but also detect a duration and pressure associated with the touch or swipe action. In some embodiments, the multimedia component 1604 may include a front camera and/or a rear camera. The front camera and/or the rear camera may receive external multimedia data when the head-mounted device 1600 is in an operation manner, such as a photographing manner or a video manner. Each of the front camera and the rear camera may be a fixed optical lens system or have focusing and optical zooming capabilities.

The audio component 1605 is configured to output and/or input an audio signal. In at least one embodiment, the audio component 1605 may include a Microphone (MIC), and the MIC is configured to receive an external audio signal when the head-mounted device 1600 is in the operation manner, such as a call manner, a recording manner and a voice recognition manner. The received audio signal may further be stored in the memory 1602 or sent through the communication component 1608. In some embodiments, the audio component 1605 further may include a speaker configured to output the audio signal.

The I/O interface 1606 provides an interface between the processor 1601 and a peripheral interface module, and the peripheral interface module may be a keyboard, a click wheel, a button, a touch panel, and the like. The button may include, but not limited to: a home button, a volume button, a starting button and a locking button.

The sensor component 1607 may include one or more sensors configured to provide status assessment in various aspects for the head-mounted device 1600. For instance, the sensor component 1607 may detect an on/off status of the head-mounted device 1600 and relative positioning of components, such as a display and small keyboard of the head-mounted device 1600, and the sensor component 1607 may further detect a change in a position of the head-mounted device 1600 or a component of the head-mounted device 1600, presence or absence of contact between the user and the head-mounted device 1600, orientation or acceleration/deceleration of the head-mounted device 1600 and a change in temperature of the head-mounted device 1600. The sensor component 1607 may include a proximity sensor configured to detect presence of an object nearby without any physical contact. The sensor component 1607 may also include a light sensor, configured for use in an imaging application. In some embodiments, the sensor component 1607 may also include an acceleration sensor, a gyroscope sensor, a magnetic sensor, a pressure sensor or a temperature sensor. In at least one embodiment, the head-mounted device 1600 determines the operation type of the control operation through the pressure sensor.

The communication component 1608 is configured to facilitate wired or wireless communication between the head-mounted device 1600 and other equipment (In at least one embodiment, the control device). The head-mounted device 1600 may access a communication-standard-based wireless network. In an embodiment, the communication component 1608 receives a broadcast signal or broadcast associated information from an external broadcast management system through a broadcast channel. In an embodiment, the communication component 1608 further may include a Near Field Communication (NFC) module to facilitate short-range communication. In at least one embodiment, the NFC module may be implemented on the basis of a Radio Frequency Identification (RFID) technology, an Infrared Data Association (IrDA) technology, an Ultra-WideBand (UWB) technology, a BT technology and another technology. The head-mounted device 1600 synchronously receives the information sent by the control device through the communication component 1608, such as the touch operation acting on a touch area received by the control device.

In addition, the skilled in the art should understand that the structure of the device 1600 illustrated in the above drawing does not constitute a limitation to the device 1600, and the device may include more or fewer components than illustrated, or a combination of certain components, or a different arrangement of components.

A connection between the head-mounted device 1600 and the control device 1700 is established using a data cable, WiFi hotspot or Bluetooth.

The control device 1700 may include one or more of the following components: a processor 1710, a memory 1720, and a display screen 1730.

The processor 1710 may include one or more processing cores. The processor 1710 connects various parts within the control device 1700 through various interfaces and lines, for performing various functions of the control device 1700 and processing data by running or executing at least one instruction stored in the memory 1720, and by calling data stored in the memory 1720. In some embodiments, the processor 1710 may be implemented with at least one of the following hardware forms: a digital signal processing (DSP), a field-programmable gate array (FPGA), a programmable logic array (PLA). The processor 1710 may integrate one or a combination of some of a central processing unit (CPU), a graphics processing unit (GPU), a neural-network processing unit (NPU), and a modem. The CPU mainly handles an operating system, a user interface, applications; the GPU is responsible for rendering and drawing the content to be displayed on the display screen 1730; the NPU is configured to implement artificial intelligence (AI) functions; and the modem is configured to handle wireless communications. It can be understood that the modem may be implemented by a separate chip without being integrated into the processor 1710.

The memory 1720 may include a random access memory (RAM) and read-only memory (ROM). In some embodiments, the memory 1720 includes a non-transitory computer-readable storage medium. The memory 1720 may be configured to store an instruction, a program, a code, a code set, or an instruction set. The memory 1720 may include a program storage area and a data storage area, where the program storage area may store an instruction for realizing an operating system, an instruction for realizing at least one function (such as a touch function, a sound playing function, an image playing function), an instruction for realizing the above-mentioned various method embodiments. The data storage area may also store data (such as audio video data, and a phone book) created by the control device 1700 in use.

The display screen 1730 is a display component for displaying a user interface. In some embodiments, the display screen 1730 may also have a touch function, through which the user can perform a touch operation on the display screen 1730 with any suitable objects such as fingers and a touch pen.

The display screen 1730 is usually arranged on a front panel of the control device 1700. The display screen 1730 may be designed as a full screen, a curved screen, a special-shaped screen, a double-sided screen, or a foldable screen. The display screen 1730 may also be designed as a combination of a full screen and a curved screen, a combination of a special-shaped screen and a curved screen, etc., which is not limited in the embodiments.

In addition, the skilled in the art can understand that the structure of the control device 1700 illustrated in the attached drawing above does not constitute a limitation of the control device 1700, and the control device 1700 may include more or fewer components than illustrated, or a combination of certain components, or a different arrangement of components. In at least one embodiment, the control device 1700 may further include a camera component, a microphone, a speaker, a RF circuit, an input unit, a sensor (such as an acceleration sensor, an angular velocity sensor, and a light sensor), an audio circuit, a WiFi module, a power supply, a bluetooth module, and other components, which will not be described herein.

An embodiment of the present disclosure also provides a computer-readable storage medium having at least one instruction stored therein, and the at least one instruction is loaded and executed by a processor to implement the method for displaying the virtual prop in the real environment image as described in the above embodiments.

According to an aspect of the present disclosure, a computer program product or a computer program is provided, and the computer program product or the computer program includes a computer instruction being stored in a computer-readable storage medium. A processor of a head-mounted device or a control device is configured to read the computer instruction from the computer-readable storage medium, and execute the computer instruction such that the head-mounted device or the control device implements the method of displaying the virtual prop in the real environment image provided in various optional implementations of the above aspect.

The skilled in the art should realize that in one or more of the above examples, the functions described in the embodiments of the present disclosure may be realized by a hardware, software, a firmware or any combination thereof. When implemented in the software, these functions can be stored in a computer-readable storage medium or transmitted as one or more instructions or codes on the computer-readable storage medium. The computer-readable storage medium includes a computer storage medium and a communication medium, where the communication medium includes any medium that facilitates the transfer of a computer program from one place to another. The storage medium can be any available medium that can be accessed by a general-purpose or special-purpose computer.

The above is merely optional embodiments of the present disclosure, and it is not used to limit the present disclosure. Any modifications, equivalent substitutions, or improvements made within the spirit and principle of the present disclosure should be included in the scope of protection of the present disclosure.

What is claimed is:

1. A method for displaying a virtual prop in a real environment image, implemented by a head-mounted device, comprising:
   superposing and displaying a scene editing interface and a virtual ray on the real environment image, the scene editing interface containing a prop selection list, and the prop selection list containing a prop selection control corresponding to at least one virtual prop;
   moving the virtual ray to intersect with a target prop selection control in the real environment image based on ray adjustment data; and in response to a first control instruction, displaying a target virtual prop corresponding to the target prop selection control in the real environment image;
wherein after superimposing and displaying the scene editing interface and the virtual ray on the real environment image, the method further comprises:
  moving the virtual ray to intersect with the target virtual prop in the real environment image based on the ray adjustment data;
  in response to a third control instruction, displaying an editing control corresponding to the target virtual prop, wherein the editing control comprises at least one of a deletion control, an enlargement control and a reduction control;
  moving the virtual ray to intersect with a target editing control in the real environment image based on the ray adjustment data; and
  in response to a fourth control instruction, editing the target virtual prop based on an editing manner corresponding to the target editing control, comprising:
    in response to the target editing control being the deleting control and receiving the fourth control instruction, deleting the target virtual prop;
    in response to the target editing control being the enlargement control and receiving the fourth control instruction, enlarging the target virtual prop by a preset magnification factor; and
    in response to the target editing control being the reduction control and receiving the fourth control instruction, reducing the target virtual prop by a preset reduction factor.

2. The method according to claim 1, wherein the first control instruction comprises a prop selection instruction and a prop placement instruction; and
  wherein in response to the first control instruction, displaying the target virtual prop corresponding to the target prop selection control in the real environment image, comprises:
    in response to the virtual ray intersecting with the target prop selection control, highlighting the target prop selection control;
    in response to the prop selection instruction, displaying the target virtual prop at an intersection of the virtual ray and the real environment image;
    moving the virtual ray and the target virtual prop based on the ray adjustment data after the prop selection instruction; and
    in response to the prop placement instruction, displaying the target virtual prop at a placement position indicated by the prop placement instruction.

3. The method according to claim 1, wherein after in response to the first control instruction, displaying the target virtual prop corresponding to the target prop selection control in the real environment image, the method further comprises:
  moving the virtual ray in the real environment image to intersect with an added prop in the real environment image based on the ray adjustment data;
  in response to a second control instruction, displaying the added prop at an intersection of the virtual ray and the real environment image; and
  moving the virtual ray and the added prop, based on the ray adjustment data after the second control instruction.

4. The method according to claim 1, wherein after in response to the first control instruction, displaying the target virtual prop corresponding to the target prop selection control in the real environment image, the method further comprises:
  based on the ray adjustment data, moving the virtual ray in the real environment image to intersect with a photographing control superimposed and displayed on the real environment image; and
  in response to a fifth control instruction, photographing the real environment image and the target virtual prop.

5. The method according to claim 4, wherein in response to the fifth control instruction, photographing the real environment image and the target virtual prop comprises:
  in response to the fifth control instruction, switching the photographing control from a default display state to a photographing display state;
  determining a target photographing manner based on an instruction type of the fifth control instruction;
  photographing the real environment image and the target virtual prop using the target photographing manner; and
  superimposing and displaying a photographed preview content on the scene editing interface.

6. The method according to claim 5, wherein superimposing and displaying the photographed preview content on the scene editing interface comprises:
  superimposing and displaying the photographed preview content within a preset duration; and
  cancelling the displaying of the photographed preview content, after a display duration of the photographed preview content reaches the preset duration.

7. The method according to claim 5, wherein at least one of a graphic, a size, a display color and a display effect of the photographing control in the photographing display state is different from that of the photographing control in the default display state.

8. The method according to claim 5, wherein determining the target photographing manner based on the instruction type of the fifth control instruction comprises:
  in response to the fifth control instruction being a photographing instruction, determining that the photographing manner is image photographing; and
  in response to the fifth control instruction being a video recording instruction, determining that the photographing manner is video recording, and displaying a recording progress through the photographing control, comprising:
    displaying a recording progress bar in the photographing control, and
    displaying a recording duration in the photographing control.

9. The method according to claim 1, wherein a data connection is established between the head-mounted device and a control device, the control device is configured to send the ray adjustment data and a control instruction to the head-mounted device, and a ray direction of the virtual ray is a device direction of the control device;
  wherein the ray adjustment data comprises a moving direction and a moving distance; the head-mounted device is configured to determine a moving direction of the virtual ray and the target virtual prop based on the moving direction of the control device, and determine a moving distance of the target virtual prop based on the moving distance of the control device and a distance mapping relationship, where the distance mapping relationship is a relationship between the moving distance of the control device and a mapping distance of the control device in the real environment image.

10. The method according to claim 1, wherein before superimposing and displaying the scene editing interface and the virtual ray on the real environment image, the method further comprises:
 superposing and displaying a scene selection interface on the real environment image, wherein the scene selection interface contains a scene selection control of at least one theme; and
 superimposing and displaying the scene editing interface and the virtual ray on the real environment image comprises:
  based on the ray adjustment data, moving the virtual ray to intersect with a target scene selection control in the real environment image; and
  in response to a sixth control instruction, superimposing and displaying the virtual ray and the scene editing interface corresponding to the target scene selection control on the real environment image.

11. The method according to claim 1, wherein a scene switching control is displayed in the scene editing interface; and
 after superimposing and displaying the scene editing interface and the virtual ray on the real environment image, the method further comprises:
  based on the ray adjustment data, moving the virtual ray to intersect with the scene switching control in the real environment image;
  in response to a seventh control instruction, superimposing and displaying a scene selection list on the real environment image, the scene selection list contains a scene selection control of at least one theme;
  based on the ray adjustment data, moving the virtual ray to intersect with a target scene selection control in the real environment image; and
  in response to an eighth control instruction, superimposing and displaying a target scene editing interface corresponding to the target scene selection control on the real environment image.

12. A terminal device, comprising:
 one or more processors; and
 a memory configured to store instructions which, when executed by the one or more processors, cause the one or more processors to:
 superpose and display a scene editing interface and a virtual ray on a real environment image, the scene editing interface containing a prop selection list, and the prop selection list containing a prop selection control corresponding to at least one virtual prop;
 move the virtual ray to intersect with a target prop selection control in the real environment image based on ray adjustment data; and
 in response to a first control instruction, display a target virtual prop corresponding to the target prop selection control in the real environment image;
 wherein after displaying the target virtual prop corresponding to the target prop selection control in the real environment image in response to the first control instruction, the instructions further cause the one or more processor to:
  based on the ray adjustment data, move the virtual ray in the real environment image to intersect with a photographing control superimposed and displayed on the real environment image; and
  in response to a fifth control instruction, switch the photographing control from a default display state to a photographing display state;
  determine a target photographing manner based on an instruction type of the fifth control instruction;
  photograph the real environment image and the target virtual prop using the target photographing manner; and
  superimpose and display a photographed preview content on the scene editing interface.

13. The terminal device according to claim 12, wherein the first control instruction comprises a prop selection instruction and a prop placement instruction; and
 wherein in response to the first control instruction, displaying the target virtual prop corresponding to the target prop selection control in the real environment image, comprises:
  in response to the virtual ray intersecting with the target prop selection control, highlight the target prop selection control;
  in response to the prop selection instruction, display the target virtual prop at an intersection of the virtual ray and the real environment image;
  move the virtual ray and the target virtual prop based on the ray adjustment data after the prop selection instruction; and
  in response to the prop placement instruction, display the target virtual prop at a placement position indicated by the prop placement instruction.

14. The terminal device according to claim 12, wherein the instructions further cause the one or more processor to:
 after in response to the first control instruction, display the target virtual prop corresponding to the target prop selection control in the real environment image;
 move the virtual ray in the real environment image to intersect with an added prop in the real environment image based on the ray adjustment data;
 in response to a second control instruction, display the added prop at an intersection of the virtual ray and the real environment image; and
 move the virtual ray and the added prop, based on the ray adjustment data after the second control instruction.

15. The terminal device according to claim 12, wherein the instructions further cause the one or more processor to:
 after superimposing and displaying the scene editing interface and the virtual ray on the real environment image,
 move the virtual ray to intersect with the target virtual prop in the real environment image based on the ray adjustment data;
 in response to a third control instruction, display an editing control corresponding to the target virtual prop;
 move the virtual ray to intersect with a target editing control in the real environment image based on the ray adjustment data; and
 in response to a fourth control instruction, edit the target virtual prop based on an editing manner corresponding to the target editing control.

16. The terminal device according to claim 15, wherein the instructions further cause the one or more processor to:
 in response to the target editing control being the deleting control and receiving the fourth control instruction, delete the target virtual prop;
 in response to the target editing control being the enlargement control and receiving the fourth control instruction, enlarge the target virtual prop by a preset magnification factor; and in response to the target editing control being the reduction control and receiving the fourth control instruction, reduce the target virtual prop by a preset reduction factor.

17. The terminal device according to claim 12, wherein before superimposing and displaying the scene editing interface and the virtual ray on the real environment image, the instructions further cause the one or more processor to:
    superpose and display a scene selection interface on the real environment image, wherein the scene selection interface contains a scene selection control of at least one theme;
    wherein the instructions further cause the one or more processor to:
        based on the ray adjustment data, move the virtual ray to intersect with a target scene selection control in the real environment image; and
        in response to a sixth control instruction, superimpose and display the virtual ray and the scene editing interface corresponding to the target scene selection control on the real environment image.

18. A system for displaying a virtual prop in a real environment image, comprising:
    a head-mounted device and a control device, a data connection being established between the head-mounted device and the control device;
    wherein the control device is configured to send a control instruction and ray adjustment data to the head-mounted device;
    wherein the head-mounted device comprises a processor and a memory; the memory is stored with at least one instruction, at least one program, a code set, or an instruction set, and the at least one instruction, the at least one program, the code set, or the instruction set is loaded and executed by the processor to:
        superpose and display a scene editing interface and a virtual ray on the real environment image, the scene editing interface containing a prop selection list, and the prop selection list containing a prop selection control corresponding to at least one virtual prop;
        move the virtual ray to intersect with a target prop selection control in the real environment image based on ray adjustment data; and
        in response to a first control instruction, display a target virtual prop corresponding to the target prop selection control in the real environment image;
    wherein before superimposing and displaying the scene editing interface and the virtual ray on the real environment image, the at least one instruction, the at least one program, the code set, or the instruction set is further loaded and executed by the processor to:
        superpose and display a scene selection interface on the real environment image, wherein the scene selection interface contains a scene selection control of at least one theme; and
        wherein the at least one instruction, the at least one program, the code set, or the instruction set is further loaded and executed by the processor to:
            based on the ray adjustment data, move the virtual ray to intersect with a target scene selection control in the real environment image; and
            in response to a sixth control instruction, superimpose and display the virtual ray and the scene editing interface corresponding to the target scene selection control on the real environment image.

19. The system according to claim 18, wherein after superimposing and displaying the scene editing interface and the virtual ray on the real environment image, the at least one instruction, the at least one program, the code set, or the instruction set is further loaded and executed by the processor to:
    move the virtual ray to intersect with the target virtual prop in the real environment image based on the ray adjustment data;
    in response to a third control instruction, display an editing control corresponding to the target virtual prop, wherein the editing control comprises at least one of a deletion control, an enlargement control and a reduction control;
    move the virtual ray to intersect with a target editing control in the real environment image based on the ray adjustment data; and
    in response to a fourth control instruction, edit the target virtual prop based on an editing manner corresponding to the target editing control;
    wherein the at least one instruction, the at least one program, the code set, or the instruction set is further loaded and executed by the processor to:
        in response to the target editing control being the deleting control and receiving the fourth control instruction, delete the target virtual prop;
        in response to the target editing control being the enlargement control and receiving the fourth control instruction, enlarge the target virtual prop by a preset magnification factor; and
        in response to the target editing control being the reduction control and receiving the fourth control instruction, reduce the target virtual prop by a preset reduction factor.

20. The system according to claim 18, wherein after displaying the target virtual prop corresponding to the target prop selection control in the real environment image in response to the first control instruction, the at least one instruction, the at least one program, the code set, or the instruction set is further loaded and executed by the processor to:
    based on the ray adjustment data, move the virtual ray in the real environment image to intersect with a photographing control superimposed and displayed on the real environment image; and
    in response to a fifth control instruction, switch the photographing control from a default display state to a photographing display state;
    determine a target photographing manner based on an instruction type of the fifth control instruction;
    photograph the real environment image and the target virtual prop using the target photographing manner; and
    superimpose and display a photographed preview content on the scene editing interface.

* * * * *